US010908645B2

(12) United States Patent
Sung et al.

(10) Patent No.: US 10,908,645 B2
(45) Date of Patent: Feb. 2, 2021

(54) METHOD FOR CONTROLLING SCREEN OUTPUT AND ELECTRONIC DEVICE SUPPORTING SAME

(71) Applicant: Samsung Electronics Co., Ltd, Suwon-si (KR)

(72) Inventors: Joo Il Sung, Seoul (KR); Jin Hong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 15/767,624

(22) PCT Filed: Sep. 30, 2016

(86) PCT No.: PCT/KR2016/010950
§ 371 (c)(1),
(2) Date: Apr. 11, 2018

(87) PCT Pub. No.: WO2017/065432
PCT Pub. Date: Apr. 20, 2017

(65) Prior Publication Data
US 2018/0299926 A1 Oct. 18, 2018

(30) Foreign Application Priority Data
Oct. 13, 2015 (KR) .......... 10-2015-0142920

(51) Int. Cl.
*G06F 1/16* (2006.01)
*G06F 21/84* (2013.01)
(Continued)

(52) U.S. Cl.
CPC .......... *G06F 1/1643* (2013.01); *G06F 1/1615* (2013.01); *G06F 1/1656* (2013.01);
(Continued)

(58) Field of Classification Search
CPC .. G06F 1/1643; G06F 1/1656; G06F 3/04817; G06F 3/0482; G06F 3/04883;
(Continued)

(56) References Cited

U.S. PATENT DOCUMENTS 9,768,818 B2 9/2017 Wong Chee
10,217,392 B2 * 2/2019 Yu .......................... G09G 3/32
(Continued)

FOREIGN PATENT DOCUMENTS

CN 101997960 A * 3/2011
WO 2015/057052 A1 4/2015
(Continued)

OTHER PUBLICATIONS

Jang, WO 2015/083873 A1, Jun. 2015, Machine Translation (obtained Oct. 2, 2019).*
(Continued)

*Primary Examiner* — Taghi T Arani
*Assistant Examiner* — Blake I Narramore

(57) ABSTRACT

Disclosed is an electronic device comprising: a housing; a display disposed on one surface of the housing; a cover comprising a first area on which a plurality of input objects are disposed and a second area on which a transparent panel is disposed, wherein the cover is disposed such that at least a portion of the display can be openably and closably covered, and is configured to provide at least a first arrangement state or a second arrangement state; and a processor which is electrically connected to the display, and is set to output a first screen associated with a first security function on an area of the display corresponding to the second area in the first arrangement state, and to output a second screen associated with a second security function on at least a portion of the display in the second arrangement state. Other various embodiments identified in the specification are also
(Continued)

possible. Besides, it may be permissible to prepare other various embodiments speculated through the specification.

19 Claims, 16 Drawing Sheets

(51) Int. Cl.
<table>
<tr><td>G06F 3/0488</td><td>(2013.01)</td></tr>
<tr><td>G09G 5/36</td><td>(2006.01)</td></tr>
<tr><td>G06F 3/0481</td><td>(2013.01)</td></tr>
<tr><td>G06F 3/0482</td><td>(2013.01)</td></tr>
</table>

(52) U.S. Cl.
CPC .......... *G06F 1/1677* (2013.01); *G06F 3/0482* (2013.01); *G06F 3/04817* (2013.01); *G06F 3/04883* (2013.01); *G06F 3/04886* (2013.01); *G06F 21/84* (2013.01); *G09G 5/36* (2013.01); *G06F 2203/04803* (2013.01); *G06F 2221/032* (2013.01); *G09G 2310/04* (2013.01); *G09G 2354/00* (2013.01); *G09G 2358/00* (2013.01)

(58) Field of Classification Search
CPC ...... G06F 21/84; G06F 1/1615; G06F 1/1677; G06F 2221/032; G06F 3/04886; G06F 2203/04803; G09G 2310/04; G09G 2354/00; G09G 2358/00; G09G 5/36
See application file for complete search history.

(56) References Cited

U.S. PATENT DOCUMENTS

<table>
<tr><td>2005/0017953 A1</td><td></td><td>1/2005</td><td>Pekka</td><td></td></tr>
<tr><td>2006/0135226 A1</td><td></td><td>6/2006</td><td>Won et al.</td><td></td></tr>
<tr><td>2008/0305771 A1*</td><td></td><td>12/2008</td><td>Yajima</td><td>.................... H04M 1/66<br>455/411</td></tr>
<tr><td>2010/0064244 A1*</td><td></td><td>3/2010</td><td>Kilpatrick, II</td><td>........ G06F 1/1649<br>715/773</td></tr>
<tr><td>2010/0248788 A1*</td><td></td><td>9/2010</td><td>Yook</td><td>..................... G06F 3/0481<br>455/566</td></tr>
<tr><td>2010/0304248 A1</td><td></td><td>12/2010</td><td>Susumu et al.</td><td></td></tr>
<tr><td>2011/0248983 A1*</td><td></td><td>10/2011</td><td>Kim</td><td>....................... G06F 1/1639<br>345/212</td></tr>
<tr><td>2012/0038571 A1*</td><td></td><td>2/2012</td><td>Susani</td><td>.................. G06F 3/0416<br>345/173</td></tr>
<tr><td>2014/0128131 A1*</td><td></td><td>5/2014</td><td>Sin</td><td>......................... H04M 1/185<br>455/575.8</td></tr>
<tr><td>2014/0274214 A1*</td><td></td><td>9/2014</td><td>Kim</td><td>.................... H04M 1/0266<br>455/566</td></tr>
<tr><td>2015/0156301 A1</td><td></td><td>6/2015</td><td>Crawford et al.</td><td></td></tr>
<tr><td>2016/0065806 A1*</td><td></td><td>3/2016</td><td>Osborne</td><td>.......... H04N 5/232411<br>348/373</td></tr>
<tr><td>2016/0277053 A1*</td><td></td><td>9/2016</td><td>Wong Chee</td><td>......... H04B 1/3888</td></tr>
<tr><td>2017/0083232 A1*</td><td></td><td>3/2017</td><td>Helmes</td><td>................. G06F 3/0237</td></tr>
</table>

FOREIGN PATENT DOCUMENTS

<table>
<tr><td>WO</td><td>2015/083873 A1</td><td>6/2015</td></tr>
<tr><td>WO</td><td>WO-2015083873 A1 *</td><td>6/2015</td></tr>
</table>

OTHER PUBLICATIONS

Jinfu, CN 101997960 A, Mar. 2011, Machine Translation (obtained Oct. 3, 2019).*
IP.com Search Query, Apr. 3, 2020 (Year: 2020).*
IP.com Search Query; Sep. 23, 2020 (Year: 2020).*
International Search Report dated Jan. 6, 2017 in connection with International Patent Application No. PCT/KR2016/010950 filed Sep. 30, 2016.

* cited by examiner ically connected with the display. The processor outputs a first screen related to a first security function on an area of the display that corresponds to the second area, when the cover is in the first arrangement state, and outputs a second screen related to a second security function on at least a partial area of the display, when the cover is in the second arrangement state.

METHOD FOR CONTROLLING SCREEN OUTPUT AND ELECTRONIC DEVICE SUPPORTING SAME

CROSS-REFERENCE TO RELATED APPLICATIONS AND CLAIM OF PRIORITY

This application is a 371 of International Application No. PCT/KR2016/010950 filed Sep. 30, 2016, which claims priority to Korean Patent Application No. KR 10-2015-0142920 filed Oct. 13, 2015, the disclosures of which are herein incorporated by reference in their entirety.

TECHNICAL FIELD

Various embodiments of the present disclosure relate to a method for controlling a screen output.

BACKGROUND

An electronic device, such as a smartphone, may include a cover for protecting an exterior (or housing) thereof. For example, the electronic device may include a cover disposed to be hingeable relative to a display thereof. A user may open the cover to view a screen output through the display and when not using the electronic device, may close the cover to protect the display.

Furthermore, the electronic device may provide a security function and may differently protect personal information, depending on a security level of the security function. For example, the electronic device may provide a separate secure area (e.g., a container) separated in software and may store personal information in the secure area or perform user authentication based on authentication information stored in the secure area, thereby providing a high-level security function. In addition, the electronic device may provide a separate hardware device for the secure area.

SUMMARY

However, the electronic device in the related art has to perform the high-level security function through a plurality of steps. For example, the electronic device in the related art may output a screen (e.g., a home screen) related to a normal function (or a low-level security function) and when an execution object (e.g., an icon) output on the screen is selected, the electronic device may perform user authentication for the high-level security function to output a screen relevant to the high-level security function.

Various embodiments of the present disclosure may provide a screen output control method for outputting screens related to different security functions, depending on an arrangement state of a cover that includes a transparent panel and is disposed to cover a display such that at least a portion of the display is able to be opened and closed, and may provide an electronic device supporting the same.

Furthermore, various embodiments of the present disclosure may provide a screen output control method for outputting a screen by providing a cover on which a plurality of input objects are arranged and executing a specified function (e.g., inputting a message, switching between security functions, executing an application, or the like) in response to a selection of the input object, and may provide an electronic device supporting the same.

An electronic device according to various embodiments of the present disclosure includes a housing, a display disposed on a surface of the housing, a cover including a first area in which a plurality of input objects are arranged and a second area in which a transparent panel is disposed, the cover being disposed to cover the display such that at least a portion of the display is able to be opened and closed and the cover being configured to provide at least a first arrangement state or a second arrangement state, and a processor electrically connected with the display. The processor outputs a first screen related to a first security function on an area of the display that corresponds to the second area, when the cover is in the first arrangement state, and outputs a second screen related to a second security function on at least a partial area of the display, when the cover is in the second arrangement state.

Other aspects, advantages, and salient features of the disclosure will become apparent to those skilled in the art from the following detailed description, which, taken in conjunction with the annexed drawings, discloses various embodiments of the present disclosure.

According to various embodiments of the present disclosure, by outputting screens related to different security functions, depending on an arrangement state of a cover that includes a transparent panel and is disposed to cover a display such that at least a portion of the display is able to be opened and closed, it is possible to rapidly switch between the different security functions.

Furthermore, according to various embodiments of the present disclosure, by providing a cover on which a plurality of input objects are arranged and executing a specified function in response to a selection of the input object, it is possible to perform the specified function even in a state in which the cover is closed.

DETAILED DESCRIPTION

Figure 1A:
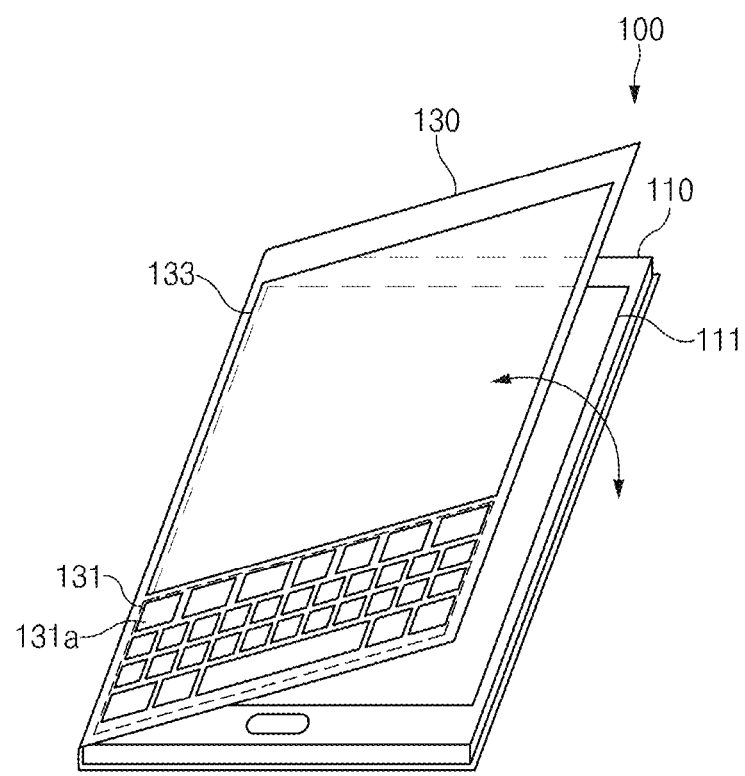
FIG. 1A illustrates an electronic device including a cover disposed thereon so as to be opened and closed, according to an embodiment.

Hereinafter, various embodiments of the present disclosure may be described with reference to accompanying drawings. Accordingly, those of ordinary skill in the art will recognize that modifications, equivalents, and/or alternatives on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1A illustrates an electronic device including a cover disposed thereon so as to be opened and closed, according to an embodiment.

Referring to FIG. 1A, an electronic device 100 may include a housing 110. The housing 110 may form an exterior of the electronic device 100 and may support and fix internal elements (e.g., a processor, a memory, a communication IC, a circuit, or the like) of the electronic device 100. The housing 110 may include a first surface (e.g., a front surface) facing a first direction, a second surface (e.g., a rear surface or back surface) facing a second direction opposite to the first direction, and side surfaces surrounding at least a portion of a space formed between the first surface and the second surface. According to various embodiments, at least one opening may be formed in the housing 110. For example, an opening may be formed in a surface (e.g., the front surface) of the housing 110, and a display 111 may be disposed in the opening.

The electronic device 100 may include a cover 130 disposed to cover the display 111 such that at least a portion of the display 111 is able to be opened and closed. The cover 130 may cover at least one surface of the housing 110 and may be disposed such that at least a portion of the surface on which the display 111 is disposed is able to be opened and closed. The shown drawing illustrates a state in which the cover 130 is disposed so as to be hingeable. According to various embodiments, the cover 130 may be integrated with the housing 110, or may be attached to/detached from the housing 110.

According to an embodiment, the cover 130 may include a first cover that covers a portion of the front surface of the housing 110, a second cover that covers a part of the side surfaces of the housing 110, and a third cover that covers a portion of the back surface of the housing 110. The first cover may be connected with the second cover, and the second cover may be connected with the third cover. Alternatively, at least one of the second cover and the third cover may be integrated with the housing 110.

According to an embodiment, the cover 130 may include the first cover that covers a portion of the front surface of the housing 110 and the second cover that covers a part of the side surfaces of the housing 110. The second cover may be connected to a side surface of the housing 110, and the first cover may be connected to the second cover.

According to an embodiment, the cover 130 may include the first cover that covers a portion of the front surface of the housing 110 and a coupling device fastened to the housing 110. The coupling device may function to connect a side surface of the first cover and a portion of the front surface of the housing 110 and to allow the first cover to rotate relative to the front surface of the housing 110. For example, the coupling device may include a locker that is rotatable within a predetermined angle range, or may include a lug and a groove. In addition, the coupling device may be provided in various forms. According to various embodiments, the cover 130 may have a structure that is connected with at least a portion of the housing 110 and slides on the surface on which the display 111 is disposed.

According to various embodiments, the cover 130 may include, on a surface thereof (e.g., the first cover), a first area 131 in which a plurality of input objects (e.g., input objects 131a) are arranged and a second area 133 in which a transparent panel is disposed. According to an embodiment, the first area 131 may be disposed on a lower side of the first cover, and the second area 133 may be disposed on an upper side of the first area 131. According to an embodiment, the cover 130 may include only the first area 131. For example, the cover 130 may have a structure to cover at least a portion of the display 111 with only the first area 131, without a structural feature for forming the second area 133.

The input objects may serve as an input interface. For example, the electronic device 100 may perform a specified function when at least one of the input objects is selected. According to various embodiments, the input objects may include a plurality of buttons that are pressed by external pressure. The plurality of buttons may have a specified character, a number, a special character, an image corresponding to a specified key, or the like printed on at least one side thereof According to various embodiments, the display 111 may include a touch panel to determine whether the input objects are selected or not. According to an embodiment, the touch panel may be a capacitive touch panel or a resistive touch panel. Furthermore, the input objects may be recessed into a first surface of the first cover (e.g., a surface of the first cover that faces the display 111 while the display 111 is covered with the first cover) and may be raised above (or may protrude from) a second surface of the first cover (e.g., a surface opposite to the first surface) that corresponds to the recessed regions. A conductive material may be at least partly disposed in the recessed regions of the input objects. In this case, a non-conductive material may be disposed in a region other than the region of the first surface of the first area 131 in which the input objects are arranged.

According to various embodiments, cavities may be formed between the surface of the display 111 and the input objects by the recessed regions and the raised regions while the display 111 is covered with the first cover. Furthermore, when pressure with a specified magnitude or higher is applied to the raised surface of a specific input object among the input objects, the conductive material disposed in the recessed region may be brought into contact with a predetermined region of the surface of the display 111 while the raised surface is being pressed. The input objects may have a predetermined elasticity or higher and may return to the original shape when pressure is released.

According to various embodiments, a circuit connected with the input objects may be embedded in the cover 130. Furthermore, the circuit may be electrically connected with at least one of the internal elements of the electronic device 100. For example, the circuit may be electrically connected with the processor of the electronic device 100. According to an embodiment, the housing 110 may have, on a surface thereof (e.g., the back surface), an electrode terminal exposed to the outside. One end of the circuit may be disposed in an area of the cover 130 that makes electrical contact with the electrode terminal of the housing 110 in this regard, the cover 130 may include, on a side thereof, an area on which the one end of the circuit is exposed.

According to an embodiment, the cover 130, which includes the first cover, the second cover, and the third cover, may include a first circuit pattern electrically connected with the input objects arranged on the first cover, a second circuit pattern disposed on the second cover and connected with the first circuit pattern, and a third circuit pattern disposed on the third cover and connected with the second circuit pattern. At least a portion of the third pattern may be exposed to the outside to make electrical contact with the electrode terminal disposed on the housing 110.

According to various embodiments, the circuit may include a control circuit that is capable of processing control signals for performing functions corresponding to the input objects. Accordingly, when a specific input object, among the input objects, is selected, the electronic device 100 may transmit a control signal for performing a function corresponding to the selected input object to the processor to perform the corresponding function, instead of performing the function by detecting the selected input object through the touch panel.

The transparent panel may contain a transparent material such that a portion of the display 111 is visible from the outside. For example, the transparent panel may contain glass, transparent plastic, or the like. In some embodiments, the transparent panel may include a transparent display. In this case, the electronic device 100 may terminate an output of the display 111 when at least one display object (e.g., an object including text, an image, an icon, a video, or the like) is output on the transparent display.

According to various embodiments, the electronic device 100 may further include a polarizer film that is attached to/detached from the transparent panel. The polarizer film may pass or block a vertically or horizontally polarized wave of incident light and may provide a specified viewing angle. Accordingly, a user may view an output screen only within the range of the viewing angle, and therefore an effect of raising a visual security level may be obtained.

Figure 1B:
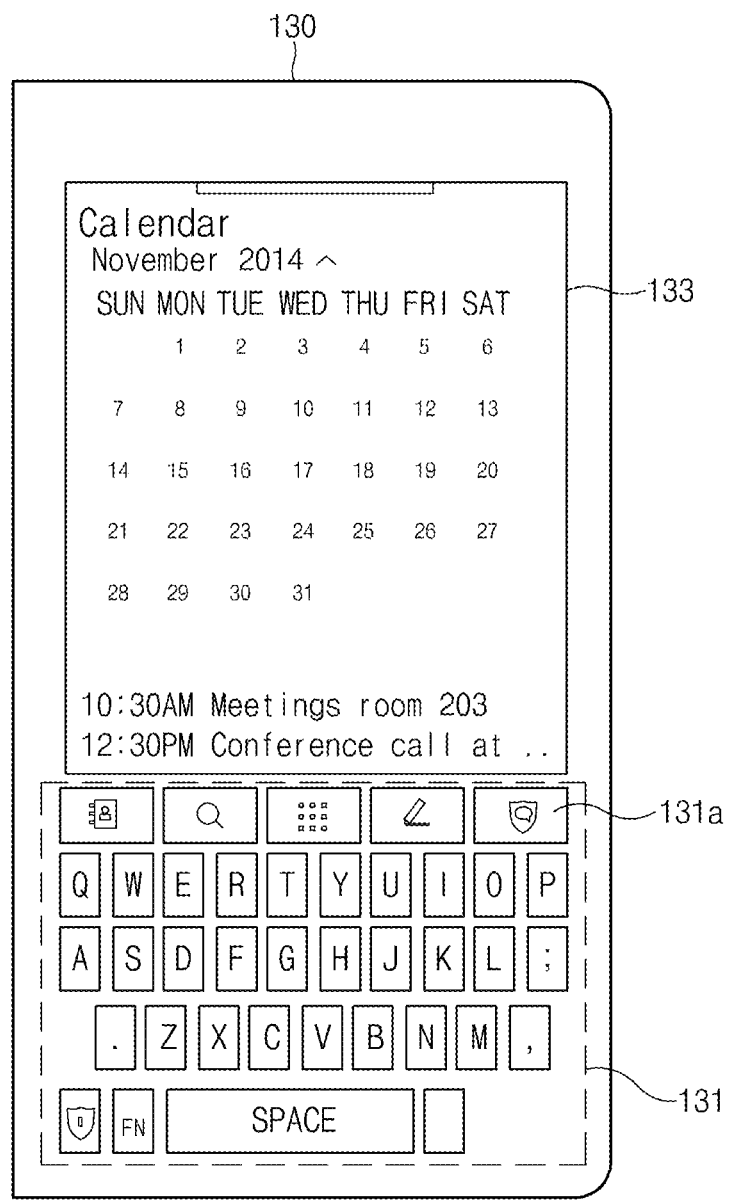
FIG. 1B is a view for explaining screen output control depending on a closed state of the cover according to an embodiment.
Figure 1C:
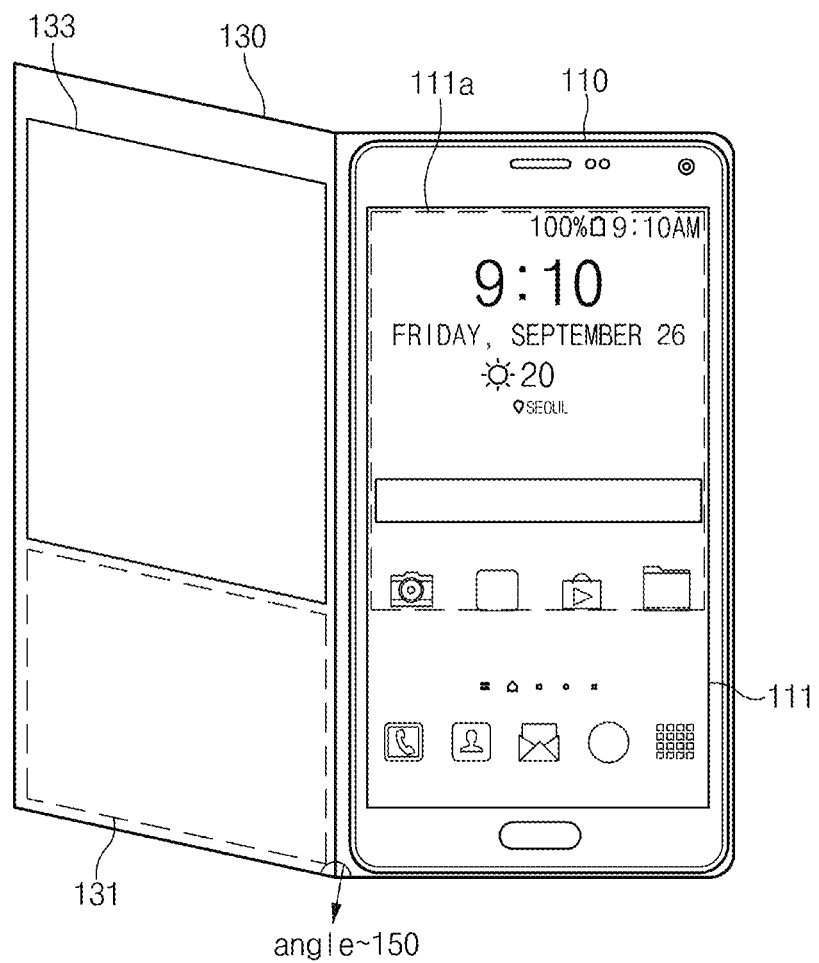
FIG. 1C is a view for explaining screen output control depending on an open state of the cover according to an embodiment.

FIGS. 1B and 1C are views for explaining screen output control depending on an arrangement state of the cover according to an embodiment. FIG. 1B is a view for explaining screen output control depending on a closed state of the cover according to an embodiment, and FIG. 1C is a view for explaining screen output control depending on an open state of the cover according to an embodiment.

Referring to FIG. 1B, the display 111 disposed on a surface of the housing 110 may display a screen including at least one display object. The display 111 may include a touch screen and may receive, for example, a touch input, a gesture input, a proximity input, or a hovering input using an electronic pen or a part of a user's body.

According to various embodiments, the electronic device 100 may differently output a screen, depending on an arrangement state of the cover 130. According to an embodiment, the electronic device 100 may output screens related to different security functions on the display 111, depending on an arrangement state of the cover 130. As illustrated in FIG. 1B, the electronic device 100 may output a first screen related to a first security function on an area 111a of the display 111 that corresponds to the second area 133 of the cover 130, while the cover 130 is closed (or while the cover 130 is closed such that a specific area of the display 111 is not exposed to the outside) (e.g., a first arrangement state), for example, while the first surface of the cover 130 is brought into contact with the display 111. Furthermore, as illustrated in FIG. 1C, the electronic device 100 may output a second screen related to a second security function on at least a partial area of the display 111, while the cover 130 is open (or while the cover 130 is open such that the specific area of the display 111 is exposed to the outside) (e.g., a second arrangement state), for example, while the first surface of the cover 130 is inclined at an angle 150 exceeding a specified angle with respect to the display 111.

In this regard, the electronic device 100 may measure the angle 150 between the first surface of the cover 130 and the display 111 through a sensor. According to various embodiments, the electronic device 100 may include a proximity sensor, a flexible bend sensor, or the like. The proximity sensor may detect a presence or absence of an object accessing a predetermined detection surface or a nearby object. The proximity sensor may be an inductive, capacitive, ultrasonic, photoelectric, or magnetic proximity sensor. For example, in the case where the proximity sensor is a photoelectric proximity sensor, a light-emitting diode or a photodiode may be disposed on the first surface or the surface of the housing 110 on which the display 111 is disposed. The flexible bend sensor may be a sensor that is bendable by itself and may detect a resistance value varying in proportion to the degree of bending. The flexible bend sensor may have a thin strip shape and may be disposed on the inner side of at least one surface (e.g., the second cover) of the cover 130. According to an embodiment, the cover 130 may contain a magnetic material (e.g., a magnet), and the electronic device 100 may decide a state of the cover 130 by detecting a magnetic field generated from the cover 130 with a magnetic sensor.

According to various embodiments, the electronic device 100 may terminate the output of the first screen and may output the second screen when the cover 130 is switched from the first arrangement state to the second arrangement state. Also, the electronic device 100 may terminate the output of the second screen and may output the first screen when the cover 130 is switched from the second arrangement state to the first arrangement state.

According to various embodiments, in the case where the transparent panel disposed in the second area 133 of the cover 130 is a transparent display, the electronic device 100 may output the first screen on a partial area of the transparent display. For example, in the case where the cover 130 is in the first arrangement state, the electronic device 100 may output the first screen on a partial area of the transparent display. In this case, the electronic device 100 may terminate or maintain the second screen output on a partial area of the display 111. Furthermore, in the case where the cover 130 is in the second arrangement state, the electronic device 100 may output the second screen on a partial area of the display 111 and may terminate or maintain the output of the first screen on the transparent display.

Figure 2:
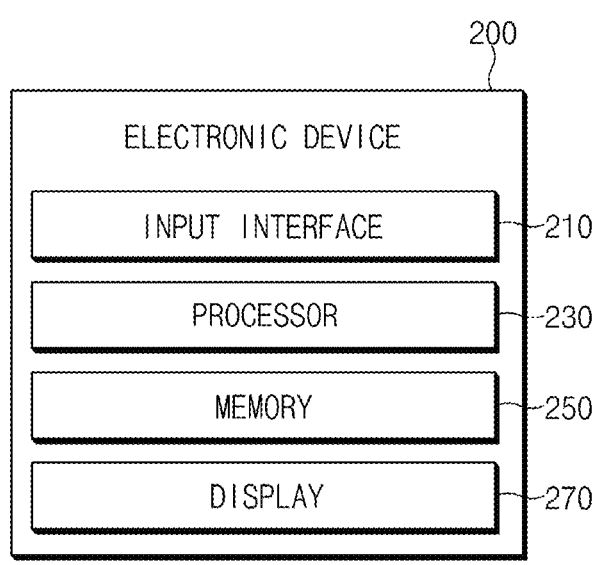
FIG. 2 illustrates an electronic device related to screen output control according to an embodiment.

FIG. 2 illustrates an electronic device related to screen output control according to an embodiment. An electronic device 200 may correspond to the electronic device 100 illustrated in FIGS. 1A to 1C. The internal elements of the electronic device 100 illustrated in FIGS. 1A to 1C will be described with reference to FIG. 2.

Referring to FIG. 2, the electronic device 200 may include an input interface 210, a processor 230, a memory 250, and a display 270. According to various embodiments, the electronic device 200 may not include at least one of the aforementioned elements and may further include at least one other element.

The input interface 210 may serve as an interface that transmits, to other element(s) of the electronic device 200, commands or data input from a user or another external device. The input interface 210 may include, for example, a touch panel, a (digital) pen sensor, a key, an ultrasonic input device, or the like. Furthermore, the input interface 210 may include, for example, the input objects (e.g., the input objects 131a) illustrated in FIG. 1A.

The processor 230 may perform operations or data processing associated with control and/or communication of at least one other element of the electronic device 200. According to an embodiment, the processor 230 may receive a user input from the input interface 210. In this case, the processor 230 may analyze the user input and may control the performance of a function corresponding to the user input. For example, when the input object is selected, the processor 230 may control a relevant module to perform a function corresponding to the input object.

According to various embodiments, the processor 230 may compute the angle (e.g., the angle 150 of FIG. 1C) between a surface (e.g., the first cover) of a cover (e.g., the cover 130 of FIG. 1A) and the display 270 and may control a screen output of the display 270 depending on the angle. According to an embodiment, the processor 230 may control the display 270 to output a first screen related to a first security function on a partial area of the display 270 in the case where the angle is less than or equal to a first magnitude (e.g., a first arrangement state). Furthermore, the processor 230 may control the display 270 to output a second screen related to a second security function on a partial area of the display 270 in the case where the angle exceeds a second magnitude (e.g., a second arrangement state).

According to various embodiments, the processor 230 may perform a security function. For example, the processor 230 may differently set restrictions on use of at least some functions included in the electronic device 200, depending on a security level of the security function. According to various embodiments, the electronic device 200 may provide a separate secure area, and the processor 230 may store specific information (e.g., personal information, authentication information, or the like) in the secure area, or may perform user authentication, based on the authentication information stored in the secure area. According to various embodiments, the secure area may be a partial area of the memory 250, or may be a separate hardware device in some embodiments.

According to various embodiments, the first security function may have a higher security level than the second security function. For example, in the second security function, the user may not perform a separate user authentication procedure, and therefore the processor 230 may block unauthorized access to the secure area. Furthermore, in the first security function, the user has to perform a user authentication procedure and in some embodiments, may perform the authentication procedure, based on the authentication information stored in the secure area. Accordingly, the processor 230 may allow access to the secure area and may allow information requiring a high security level to be stored in the secure area.

According to various embodiments, the processor 230 may drive an operating system. The operating system may provide, for example, an underlying environment for controlling hardware included in the electronic device 200 and executing application programs. The operating system may provide different environments, depending on the security functions. According to various embodiments, the processor 230 may drive a plurality of operating systems. According to an embodiment, the processor 230 may drive and operate a first operating system with the first security function and may drive and operate a second operating system with the second security function.

According to various embodiments, the processor 230 may determine whether to enable the operating systems. For example, in the case where the cover is in the first arrangement state, the processor 230 may disable the second operating system operated with the second security function and may enable the first operating system operated with the first security function. Furthermore, in the case where the cover is in the second arrangement state, the processor 230 may disable the first operating system and may enable the second operating system.

According to various embodiments, the processor 230 may provide notification related to the security functions. According to an embodiment, the processor 230 may provide notification related to the second security function (e.g., message reception notification, mail reception notification, a schedule check notification, or the like) on a partial area of the first screen when the notification related to the second security function is generated in the state in which the first screen related to the first security function is output. For example, the processor 230 may output a display object (e.g., a specified notification image) corresponding to the notification on a partial area of the first screen. Furthermore, the processor 230 may provide notification related to the first security function on a partial area of the second screen when the notification related to the first security function is generated in the state in which the second screen related to the second security function is output.

The memory 250 may store commands or data associated with at least one other element of the electronic device 200. According to an embodiment, the memory 250 may store software and/or programs. For example, the memory 250 may store the operating system and may store various types of application programs. According to various embodiments, the memory 250 may specify a part of a storage area as the secure area. For example, the memory 250 may store data (e.g., authentication information, personal information, a specific application, or the like) related to the first security function in the secure area.

The display 270 may display a screen including at least one display object. According to various embodiments, the display 270 may display the first screen or the second screen in a specified area. The display 270 may include a touch screen and may receive, for example, a touch input, a gesture input, a proximity input, or a hovering input using an electronic pen or a part of a user's body. According to various embodiments, the display 270 may detect a touch input that is generated by a selection of the input objects in an area of the display 270 that corresponds to a first area (e.g., the first area 131 of FIG. 1A) in which the input objects are arranged. For example, when the input objects are pressed by pressure of a specified magnitude or higher and are brought into contact with the display 270, the display 270 may detect the contact and may transmit the contact location and intensity to the processor 230.

As described above, according to various embodiments, an electronic device may include a housing, a display disposed on a surface of the housing, a cover including a first area in which a plurality of input objects are arranged and a second area in which a transparent panel is disposed, in which the cover is disposed to cover the display such that at least a portion of the display is able to be opened and closed and the cover is configured to provide at least a first arrangement state or a second arrangement state, and a processor electrically connected with the display. The processor may output a first screen related to a first security function on an area of the display that corresponds to the second area, when the cover is in the first arrangement state, and may output a second screen related to a second security function on at least a partial area of the display, when the cover is in the second arrangement state.

According to various embodiments, in response to an input for selecting the first area in the first arrangement state, the processor may execute a first function corresponding to the input and may output an execution screen of the first function on the area of the display that corresponds to the second area.

According to various embodiments, the processor may output, on a partial area of the first screen, a display object corresponding to a second function associated with the first function.

According to various embodiments, the processor may switch the first screen to a third screen related to the first security function (e.g., an execution screen of another application related to the first security function) in response to a specified gesture input to the second area.

According to various embodiments, the processor may switch the first screen to the second screen in response to an input for selecting a specified input object, among the input objects arranged in the first area, in the first arrangement state.

According to various embodiments, the processor may switch the second screen to the first screen in response to an input for selecting the specified input object in the state in which the first screen is switched to the second screen.

According to various embodiments, in the case where the first screen is an execution screen of a selected application related to the first security function, the processor may resize and output the first screen instead of outputting the second screen when the first arrangement state is switched to the second arrangement state.

According to various embodiments, the processor may provide notification related to the second security function on a partial area of the first screen when the notification related to the second security function is generated in the first arrangement state.

According to various embodiments, in a case where the first security function is operated on a first operating system and the second security function is operated on a second operating system, the processor may switch the first operating system into an active state and the second operating system into an inactive state when the cover is in the first arrangement state, and may switch the first operating system into an inactive state and the second operating system into an active state when the cover is in the second arrangement state.

According to various embodiments, the transparent panel may be electrically connected to the processor to output at least one display object, and the processor may output the first screen on at least a partial area of the transparent panel in the first arrangement state.

According to various embodiments, at least one of the input objects may be electrically connected to the processor, and the processor may process a function corresponding to the input object in response to an input for selecting the input object.

Figure 3:
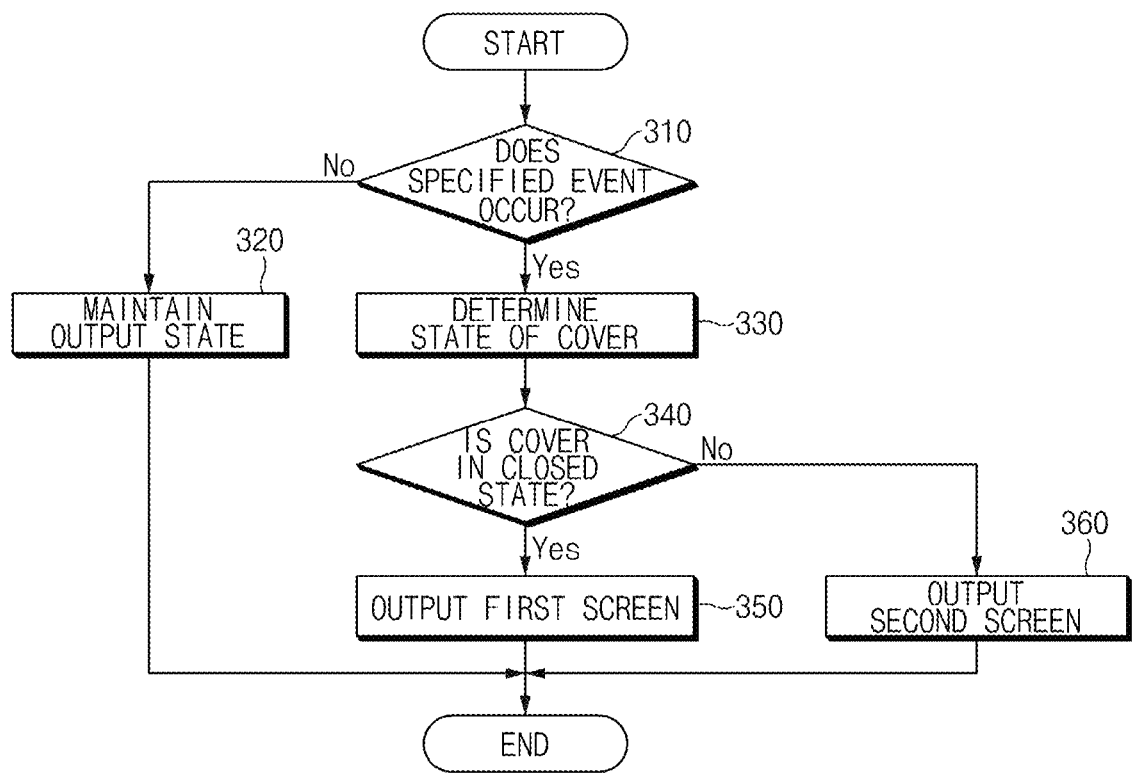
FIG. 3 illustrates an electronic device operating method related to screen output control according to an embodiment.

FIG. 3 illustrates an electronic device operating method related to screen output control according to an embodiment.

Referring to FIG. 3, in operation 310, an electronic device (e.g., the electronic device 100 of FIG. 1A) may determine whether a specified event occurs. According to an embodiment, the electronic device may determine the occurrence or non-occurrence of a system event associated with turning on the electronic device (or turning on a display (e.g., the display 111 of FIG. 1A)), a system event associated with switching between screens of the display, a communication event associated with receiving data from an external electronic device, an input event associated with turning on the display, or the like. The system event associated with turning on the electronic device (or turning on the display) may include, for example, an event for (re-)driving a platform (or an operating system), an alarm event, or the like. The system event associated with switching between screens of the display may include, for example, an event for changing an arrangement state of a cover (e.g., the cover 130 of FIG. 1A). The communication event associated with receiving data from the external electronic device may include, for example, a message reception event, a call reception event, or the like. The input event associated with turning on the display may include, for example, a touch input event, a gesture input event, a button input event, or the like on the display.

According to various embodiments, in operation 320, the electronic device may maintain the current screen output state in the case where the above-described events do not occur. According to various embodiments, in operation 330, the electronic device may determine a state of the cover in the case where at least one of the above-described events occurs. According to an embodiment, the electronic device may compute the angle between the display and a surface (e.g., a first cover) of the cover through a sensor.

In operation 340, the electronic device may determine whether the cover is closed. According to an embodiment, the electronic device may determine that the cover is in a closed state (e.g., a first arrangement state) in the case where the computed angle is less than or equal to a first magnitude and may determine that the cover is in an open state (e.g., a second arrangement state) in the case where the computed angle exceeds a second magnitude.

According to various embodiments, in operation 350, the electronic device may output a first screen related to a first security function (e.g., a high-level security function) when it is determined that the cover is in a closed state. For example, the electronic device may output a user authentication screen for executing the first security function, or may output an execution screen of an application included in the first security function in the case where user authentication is completed. In some embodiments, in the case where the first security function is operated on a first operating system, the electronic device may drive and enable the first operating system in the state in which the first operating system is not driven and may enable the first operating system in the state in which the first operating system is driven.

According to various embodiments, the electronic device may output the first screen on an area of the display (e.g., the area 111a of FIG. 1C) that corresponds to a second area (e.g., the second area 133 of FIG. 1A) of the cover in which a transparent panel is disposed. Accordingly, a user may view the first screen through the transparent panel.

According to various embodiments, in operation 360, the electronic device may output a second screen related to a second security function (e.g., a low-level security function or a normal function) on the display when it is determined that the cover is in an open state. For example, the electronic device may output a user authentication screen for executing the second security function, or may output an execution screen of an application included in the second security function in the state in which user authentication is completed or not required. In some embodiments, in the case where the second security function is operated on a second operating system, the electronic device may drive and enable the second operating system in the state in which the second operating system is not driven and may enable the second operating system in the state in which the second operating system is driven.

According to various embodiments, the electronic device may drive at least one of the first operating system and the second operating system at the time when the electronic device is turned on, and may switch at least one of the first and second operating systems into a disabled state in the case where both the first and second operating systems are driven.

Figure 4:
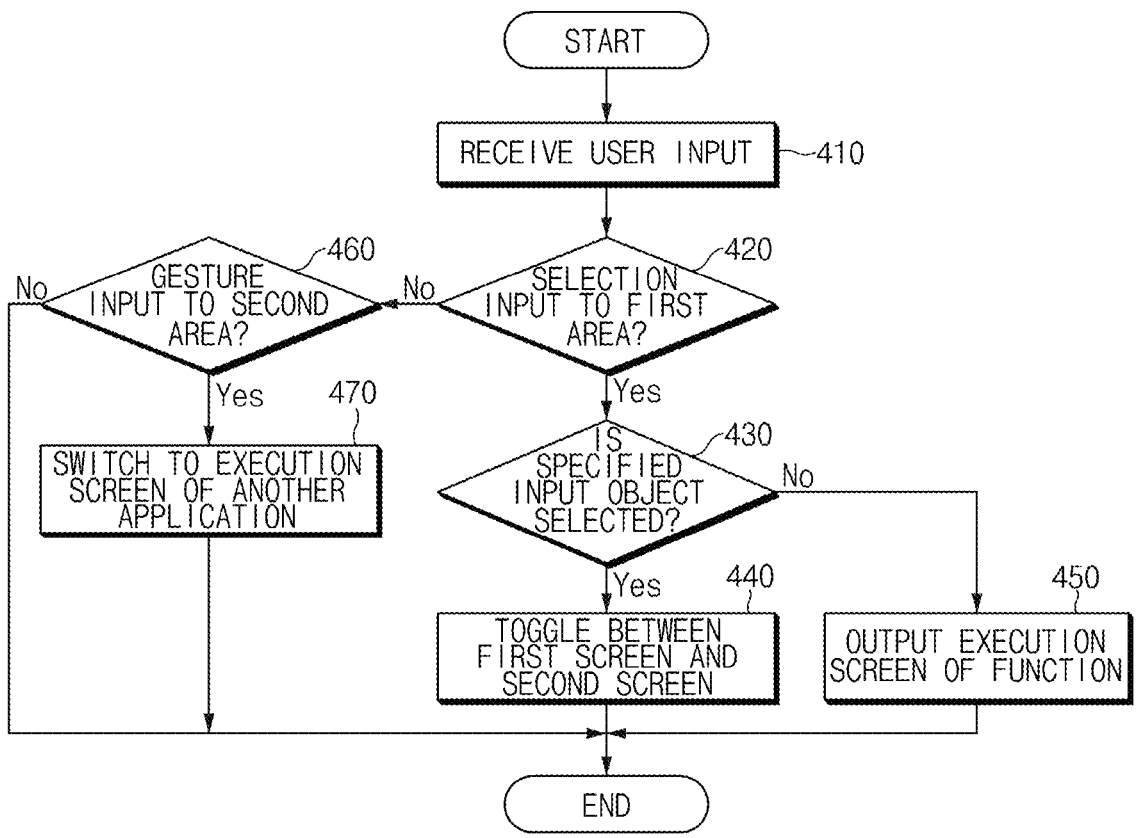
FIG. 4 illustrates an electronic device operating method related to user input processing in a state in which a cover is closed, according to an embodiment.

FIG. 4 illustrates an electronic device operating method related to user input processing in a state in which a cover is closed, according to an embodiment.

Referring to FIG. 4, in operation 410, an electronic device (e.g., the electronic device 100 of FIG. 1A) may receive a user input in the state in which a cover (e.g., the cover 130 of FIG. 1A) is closed (e.g., a first arrangement state). For example, the electronic device may receive a specified user input in the state in which the cover is closed and a first screen related to a first security function is output on a display (e.g., the display 111 of FIG. 1A).

In operation 420, the electronic device may determine whether the user input is a selection input to a first area (e.g., the first area 131 of FIG. 1A) of the cover. According to an embodiment, the electronic device may determine whether the user input is an input (e.g., a touch input) to the first area. According to various embodiments, the electronic device may determine whether the input location of the user input is within an area of the display that corresponds to the first area.

According to various embodiments, in the case where the user input is a selection input to the first area, the electronic device may, in operation 430, determine whether a specified input object (e.g., a security function switch button object) among a plurality of input objects arranged in the first area is selected. For example, the electronic device may identify the input object corresponding to the input location of the user input.

According to various embodiments, in operation 440, the electronic device may switch between the first security function and a second security function in the case where the user input is an input for selecting the specified input object. For example, the electronic device may toggle between the first screen related to the first security function and a second screen related to the second security function. For example, in the state in which the first screen is output, the electronic device may terminate the output of the first screen and may output the second screen. Alternatively, in the state in which the second screen is output, the electronic device may terminate the output of the second screen and may output the first screen.

According to various embodiments, in operation 450, the electronic device may execute a preset function corresponding to the selected input object and may output an execution screen of the preset function on the display in the case where the user input is not an input for selecting the specified input object. The preset function may include, for example, a function of executing an application included in the first security function (e.g., a message management application, a mail management application, a memo application, a schedule management application, a contact application, a search application, or a messenger application), a function of entering a character, a number, a special character, or an image into a specific screen (e.g., a text input screen) of the application, or the like.

According to various embodiments, in the case where the user input is not a selection input to the first area, the electronic device may, in operation 460, determine whether the user input is an input (e.g., a gesture input) to a second area (e.g., the second area 133 of FIG. 1A) of the cover. According to an embodiment, the electronic device may determine whether a touch gesture (or a touch input) or a swipe gesture is input to the second area.

According to various embodiments, the electronic device may maintain the screen output state in the case where the user input is not an input (e.g., a gesture input) to the second area. According to various embodiments, in the case where the user input is an input to the second area, the electronic device may, in operation 470, select another application included in the first security function according to the type of input and switch the output screen to an execution screen (e.g., a third screen) of the selected application.

Figure 5:
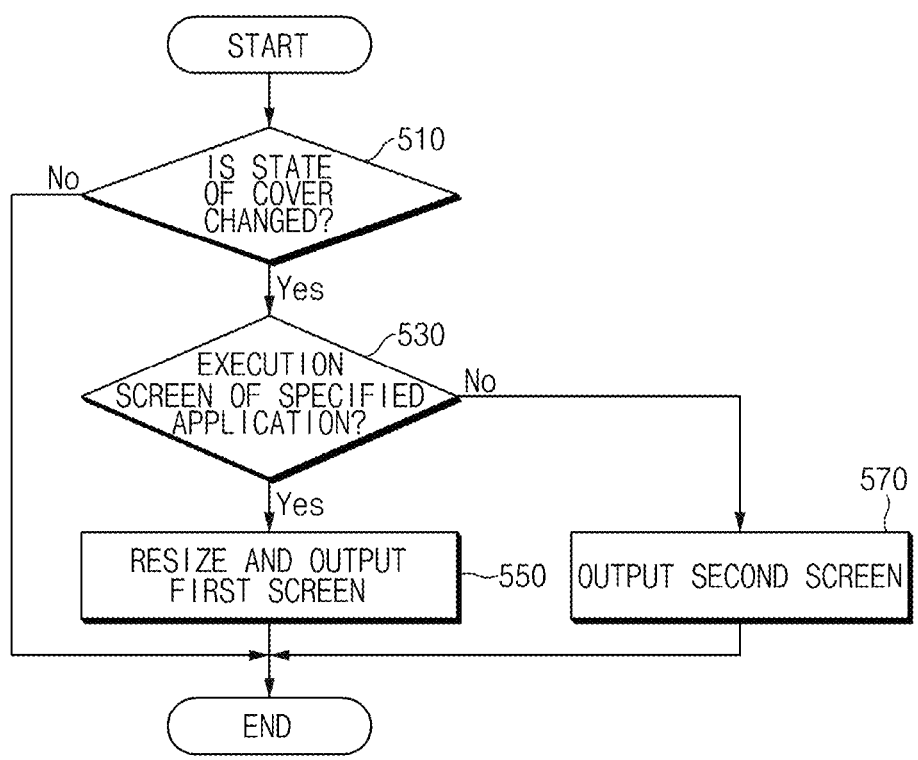
FIG. 5 illustrates an electronic device operating method related to a change in an arrangement state of a cover in a state in which the cover is closed, according to an embodiment.

FIG. 5 illustrates an electronic device operating method related to a change in an arrangement state of a cover in a state in which the cover is closed, according to an embodiment.

Referring to FIG. 5, an electronic device (e.g., the electronic device 100 of FIG. 1A) may output a first screen related to a first security function on a display (e.g., the display 111 of FIG. 1A) in the state in which a cover (e.g., the cover 130 of FIG. 1A) is closed (e.g., a first arrangement state). In operation 510, the electronic device may determine whether an arrangement state of the cover is changed in the state in which the first screen is output. According to an embodiment, the electronic device may compute the angle (e.g., the angle 150 of FIG. 1C) between a surface (e.g., the first cover) of the cover and the display through a sensor included in the electronic device. In the case where the angle is less than or equal to a first magnitude, the electronic device may determine that the cover is in a closed state (e.g., the first arrangement state). Furthermore, in the case where the angle is greater than a second magnitude, the electronic device may determine that the cover is in an open state (e.g., a second arrangement state).

According to various embodiments, when the cover is changed from the first arrangement state to the second arrangement state, the electronic device may, in operation 530, determine whether the first screen is an execution screen of a specified application. According to an embodiment, the electronic device may determine whether the first screen is an execution screen of a specified (or selected) application (e.g., a mail management application or an application specified by a user) among applications included in the first security function.

According to various embodiments, in operation 550, the electronic device may resize and output the first screen on the display in the case where the first screen is the execution screen of the specified application. For example, when the cover is opened, the electronic device may resize and output the execution screen of the specified application that is output in the state in which the cover is closed. Accordingly, a user may open the cover to view an execution screen larger than the execution screen of the specified application that is output in the state in which the cover is closed.

According to an embodiment, even in the case where the cover is in the second arrangement state, the electronic device may provide, on the first screen, a menu (e.g., an icon) for displaying an execution screen of an application that is output on the first screen. When the user selects the menu, the electronic device may continually or continuously provide the execution screen of the application even in the case where the cover is in the second arrangement state. According to an embodiment, even in the second arrangement state, the electronic device may continually or continuously provide an execution screen of an application provided in the first arrangement state, when a specified input (e.g., a specified button input or gesture input, or a combination thereof) is generated before or after the cover is changed from the first arrangement state to the second arrangement state.

According to various embodiments, in operation 570, the electronic device may output a second screen related to a second security function on the display in the case where the first screen is not the execution screen of the specified application. In this case, the electronic device may terminate the output of the first screen.

As described above, according to various embodiments, a method for controlling a screen output of an electronic device may include detecting occurrence of a specified event, determining an arrangement state of a cover that includes a first area in which a plurality of input objects are arranged and a second area in which a transparent panel is disposed, in which the cover is disposed to cover the display such that at least a portion of the display is able to be opened and closed and the cover is configured to provide at least a first arrangement state or a second arrangement state, outputting a first screen related to a first security function on an area of the display that corresponds to the second area, when the cover is in the first arrangement state, and outputting a second screen related to a second security function on at least a partial area of the display, when the cover is in the second arrangement state.

According to various embodiments, the method may further include executing a first function in response to an input for selecting the first area in the first arrangement state, and outputting an execution screen of the first function on the area of the display that corresponds to the second area.

According to various embodiments, the outputting of the execution screen of the first function may include outputting, on a partial area of the first screen, a display object corresponding to a second function associated with the first function.

According to various embodiments, the method may further include switching the first screen to a third screen related to the first security function in response to a specified gesture input to the second area.

According to various embodiments, the method may further include switching the first screen to the second screen in response to an input for selecting a specified input object, among the input objects arranged in the first area, in the first arrangement state.

According to various embodiments, the method may further include switching the second screen to the first screen in response to an input for selecting the specified input object in the state in which the first screen is switched to the second screen.

According to various embodiments, the method may further include resizing and outputting the first screen instead of outputting the second screen when the first arrangement state is switched to the second arrangement state in the case where the first screen is an execution screen of a selected application related to the first security function.

According to various embodiments, the method may further include providing notification related to the second security function on a partial area of the first screen when the notification related to the second security function is generated in the first arrangement state.

According to various embodiments, the method may further include switching the first operating system into an active state and the second operating system into an inactive state when the cover is in the first arrangement state, in the case where the first security function is operated on a first operating system, and the second security function is operated on a second operating system, and switching the first operating system into an inactive state and the second operating system into an active state when the cover is in the second arrangement state.

Figure 6:
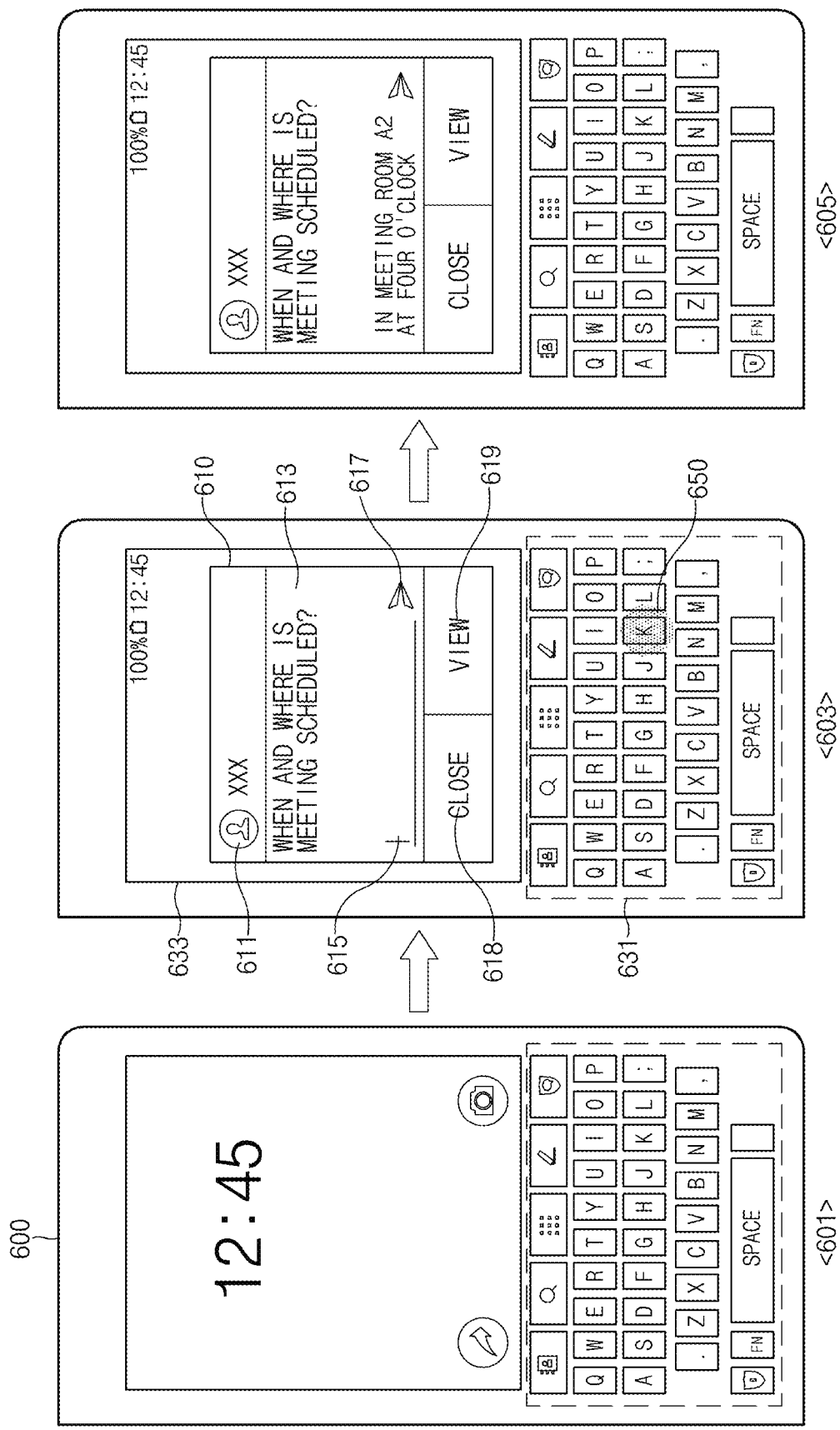
FIG. 6 is a view for explaining an input of a message in a state in which a cover is closed, according to an embodiment.

FIG. 6 is a view for explaining an input of a message in a state in which a cover is closed, according to an embodiment.

Referring to FIG. 6, as in a first state 601, an electronic device (e.g., the electronic device 100 of FIG. 1A) may output a first screen related to a first security function on an area of a display (e.g., the area 111*a* of FIG. 1C) that corresponds to a second area 633 of a cover 600, in the state in which the cover 600 is closed (e.g., a first arrangement state). In the first state 601, the electronic device may receive a message (or an e-mail). According to an embodiment, the message (or the mail) may be output through an execution screen of a message management application (or a mail management application) that is included in the first security function. For example, as in a second state 603, the electronic device may output the execution screen of the message management application on the first screen. The shown drawing illustrates a state in which the electronic device outputs a message reception screen 610 of the execution screen of the message management application on the first screen.

According to various embodiments, when receiving a message related to a second security function, the electronic device may provide notification of the receipt of the message on a partial area of the first screen. According to an embodiment, the electronic device may display a notification image in an upper region of the first screen. According to various embodiments, the electronic device may switch the first screen to a second screen related to the second security function in response to a selection of the notification image. For example, the electronic device may output the message through an execution screen of a message management application included in the second security function.

According to various embodiments, the message reception screen 610 may include a counterpart information display object 611, a received-message display object 613, a message input field 615, a message send button 617, a message reception screen close button 618, a message confirmation button 619, or the like. The counterpart information display object 611 may include information, such as an image (e.g., a photo), an identifier (e.g., the name, ID, or telephone number), or the like of the counterpart having sent the message. The received-message display object 613 may represent the message received from the counterpart as text, an image, a video, or the like according to the type thereof. The message input field 615 may be an object for displaying a message input in response to a request for input of a message to be sent to the counterpart. The message send button 617 may transmit a control signal to a processor to send the input message to the counterpart. The message reception screen close button 618 may transmit a control signal to the processor to terminate the output of the message reception screen 610. The message confirmation button 619 may transmit a control signal to the processor to terminate the output of the message reception screen 610 and to output a message transmission/reception history information screen (not illustrated). The message transmission/reception history information screen may be, for example, a screen for outputting a transmission/reception history of messages exchanged with the counterpart in a chronological order.

According to various embodiments, in the second state 603, the electronic device may receive an input of a specified character, a number, a special character, or an image corresponding to a specified key in response to a selection 650 of a specific input object among input objects arranged in a first area 631 of the cover 600. According to various embodiments, as in a third state 605, the electronic device may output the input character, number, special character, or image in the message input field 615.

Figure 7:
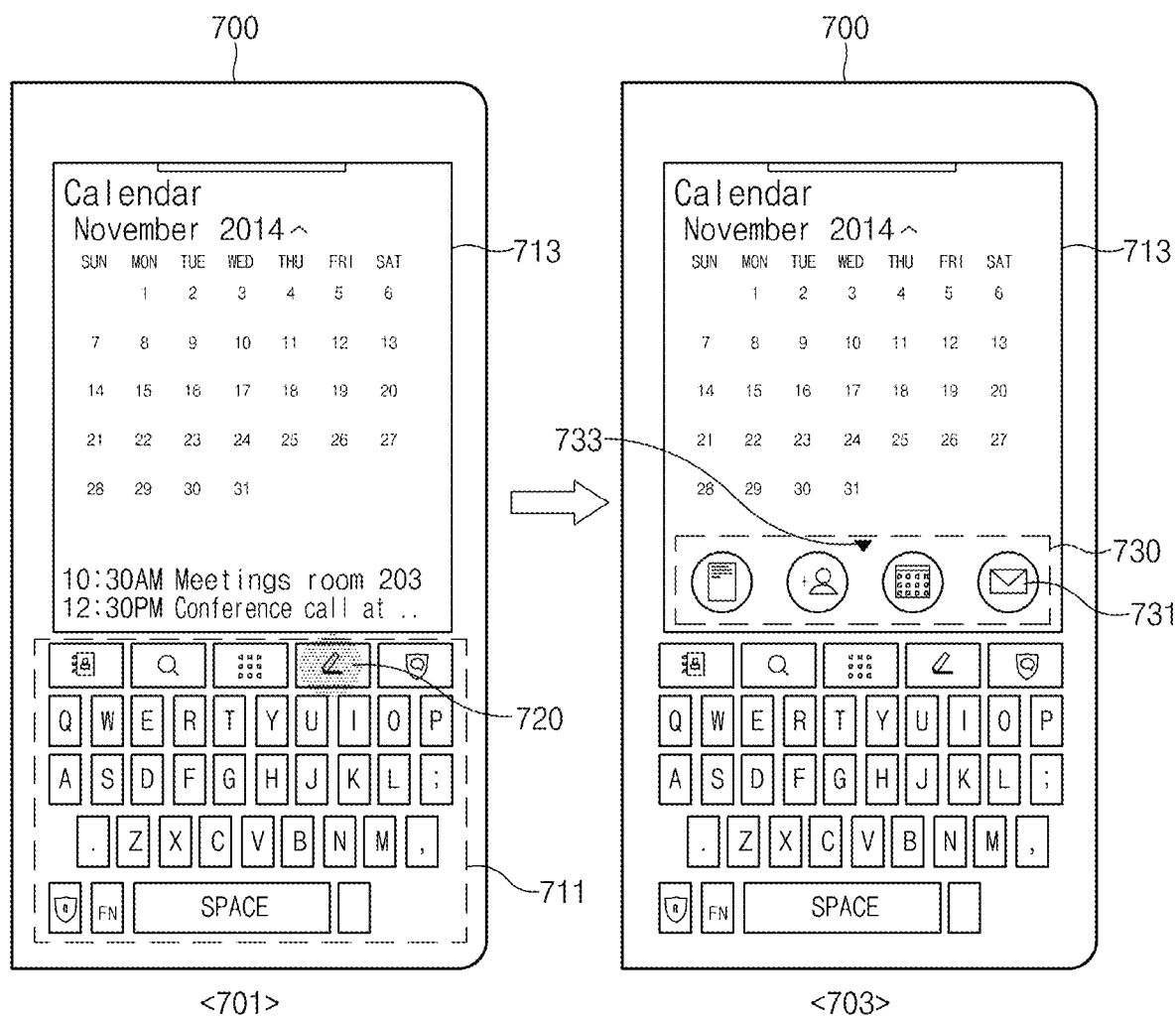
FIG. 7 is a view for explaining an output of a display object corresponding to a sub-function in a state in which a cover is closed, according to an embodiment.

FIG. 7 is a view for explaining an output of a display object corresponding to a sub-function in a state in which a cover is closed, according to an embodiment.

Referring to FIG. 7, as in a first state 701, an electronic device (e.g., the electronic device 100 of FIG. 1A) may output a first screen related to a first security function on an area of a display (e.g., the area 111a of FIG. 1C) that corresponds to a second area 713 of a cover 700, in the state in which the cover 700 is closed (e.g., a first arrangement state). According to various embodiments, the electronic device may perform a preset function in response to a selection 720 of a specific input object among input objects arranged in a first area 711 of the cover 700. According to an embodiment, in the case where the preset function includes a sub-function, the electronic device may output a display object 731 corresponding to the sub-function on the area of the display that corresponds to the second area 713, instead of performing the preset function. For example, in the case where the preset function is a quick create function, the electronic device may output a display object that corresponds to a contact search function, a schedule check function, a memo function, or a mail management function that is included in the quick create function, on the area of the display that corresponds to the second area 713. The shown drawing illustrates a state in which the display object 731 corresponding to the sub-function is output in a lower region 730 of the area of the display, as in a second state 703.

According to various embodiments, the electronic device may output a toggle button 733 in the lower region 730 of the area of the display. According to an embodiment, the electronic device may terminate the output of the display object 731 corresponding to the sub-function in response to a selection of the toggle button 733. In some embodiments, the electronic device may move the toggle button 733 from the lower region 730 of the area of the display to the lowermost region thereof and may change the type or shape of the toggle button 733 when the output of the display object 731 corresponding to the sub-function is terminated in response to the selection of the toggle button 733. Furthermore, after the toggle button 733 is moved to the lowermost region, the electronic device may output the display object 731 corresponding to the sub-function again in response to a selection of the toggle button 733.

Figure 8:
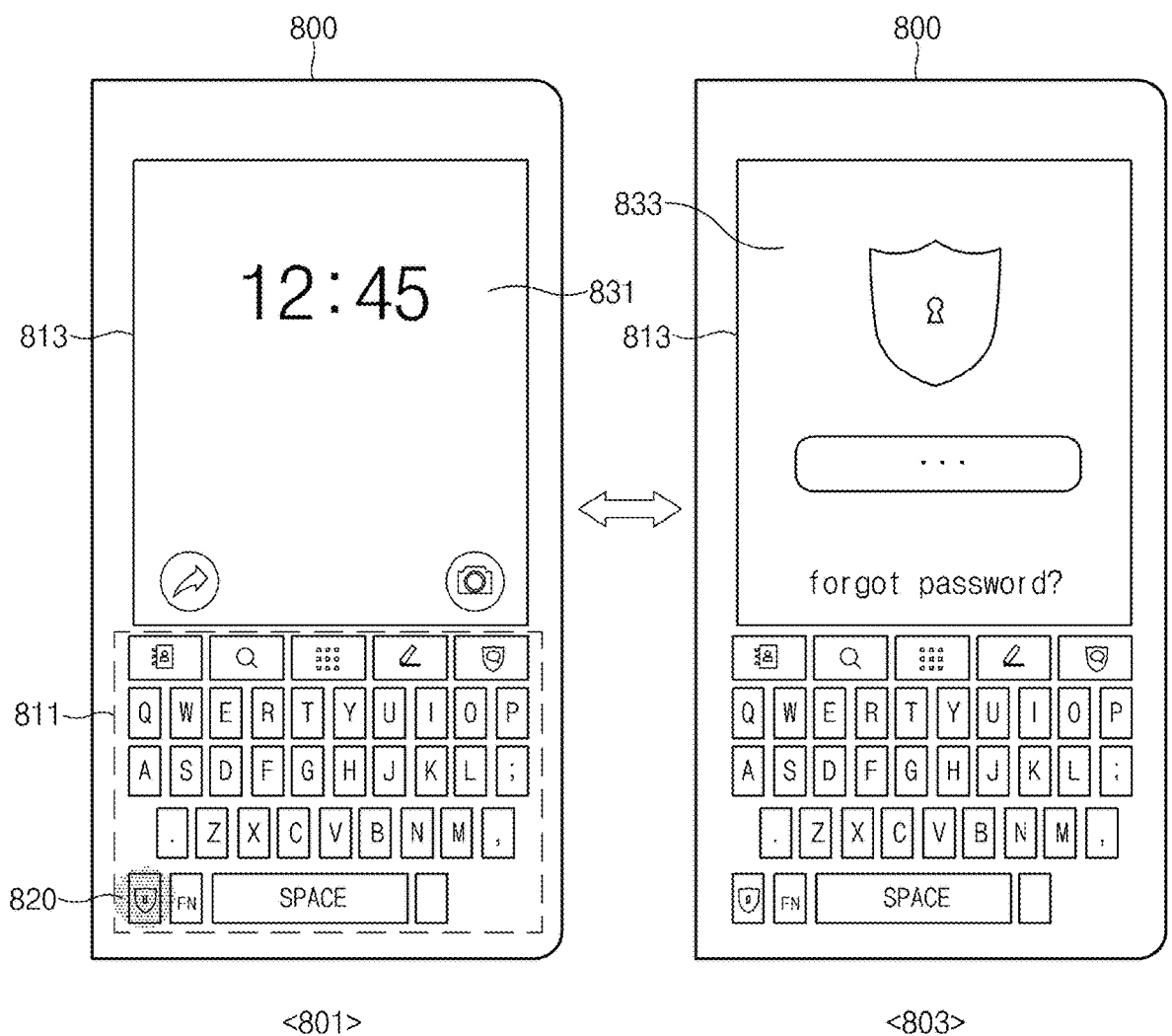
FIG. 8 is a view for explaining a security function switch in a state in which a cover is closed, according to an embodiment.

FIG. 8 is a view for explaining a security function switch in a state in which a cover is closed, according to an embodiment.

Referring to FIG. 8, as in a first state 801, an electronic device (e.g., the electronic device 100 of FIG. 1A) may output a first screen 831 related to a first security function on an area of a display (e.g., the area 111a of FIG. 1C) that corresponds to a second area 813 of a cover 800, in the state in which the cover 800 is closed (e.g., a first arrangement state). According to various embodiments, the electronic device may switch between security functions in response to a selection 820 of a specific input object among input objects arranged in a first area 811 of the cover 800. For example, as in a second state 803, the electronic device may switch the first screen 831 to a second screen 833 related to a second security function in response to the selection 820 of the input object (e.g., a security function switch button object) that is configured to switch between security functions.

According to various embodiments, the electronic device may switch the second screen 833 to the first screen 831 when the input object configured to switch between security functions is selected while the second screen 833 is output. According to various embodiments, in the case where the first security function and the second security function are operated on different operating systems, the electronic device may determine whether to enable the corresponding operating system in response to the switch of the security functions. For example, in the case where the first security function is operated on a first operating system and the second security function is operated on a second operating system, the electronic device may disable the first operating system and may enable the second operating system when the first security function is switched to the second security function in response to the selection 820 of the input object configured to switch between security functions. Furthermore, the electronic device may disable the second operating system and may enable the first operating system when the second security function is switched to the first security function.

Figure 9:
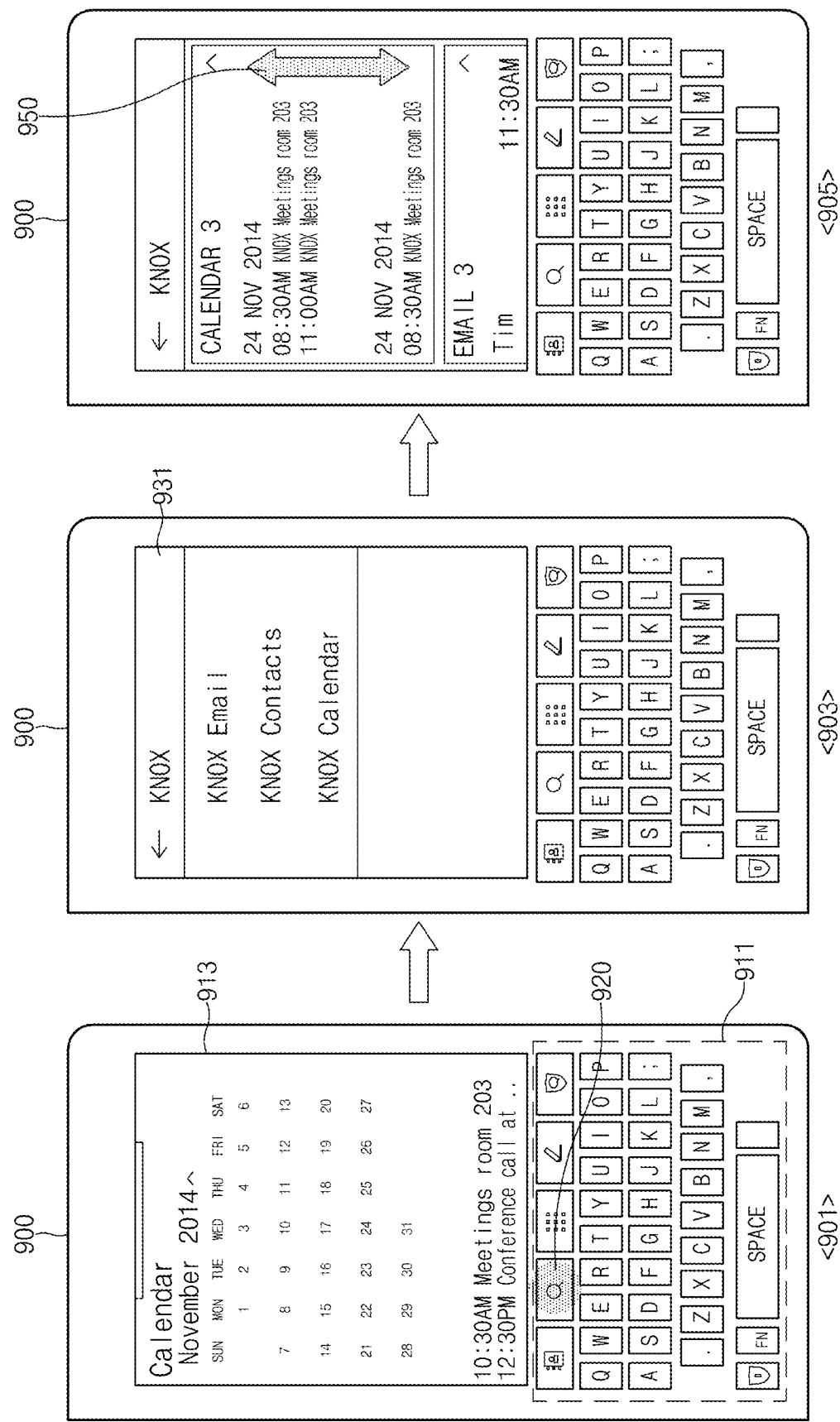
FIG. 9 is a view for explaining shortcut execution of an application in a state in which a cover is closed, according to an embodiment.

FIG. 9 is a view for explaining shortcut execution of an application in a state in which a cover is closed, according to an embodiment.

Referring to FIG. 9, as in a first state 901, an electronic device (e.g., the electronic device 100 of FIG. 1A) may output a first screen related to a first security function on an area of a display (e.g., the area 111a of FIG. 1C) that corresponds to a second area 913 of a cover 900, in the state in which the cover 900 is closed (e.g., a first arrangement state). According to various embodiments, at least one of input objects arranged in a first area 911 of the cover 900 may be a shortcut button configured to execute a specific application included in the first security function. For example, as in a second state 903, the electronic device may execute a search application in response to a selection 920 of a shortcut button for the search application and may output an execution screen 931 of the search application on the first screen.

According to various embodiments, as in a third state 905, the electronic device may scroll and output the execution screen 931 of the search application when a specified user input 950 (e.g., a gesture input) is applied to the execution screen 931 of the search application.

According to various embodiments, various other shortcut buttons may be present, in addition to the shortcut button of the search application. At least one of the input objects may include a shortcut button of a message management application, a shortcut button of a mail management application, a shortcut button of a memo application, a shortcut button of a schedule management application, a shortcut button of a contact application, a shortcut button of a messenger application, or the like. In some embodiments, the shortcut button may be configured to execute an application included in a second security function. According to various embodiments, when a shortcut button configured to execute an application included in the second security function is selected, the electronic device may terminate the output of the first screen and may output a second screen related to the second security function, that is, an execution screen of the application included in the second security function.

Figure 10:
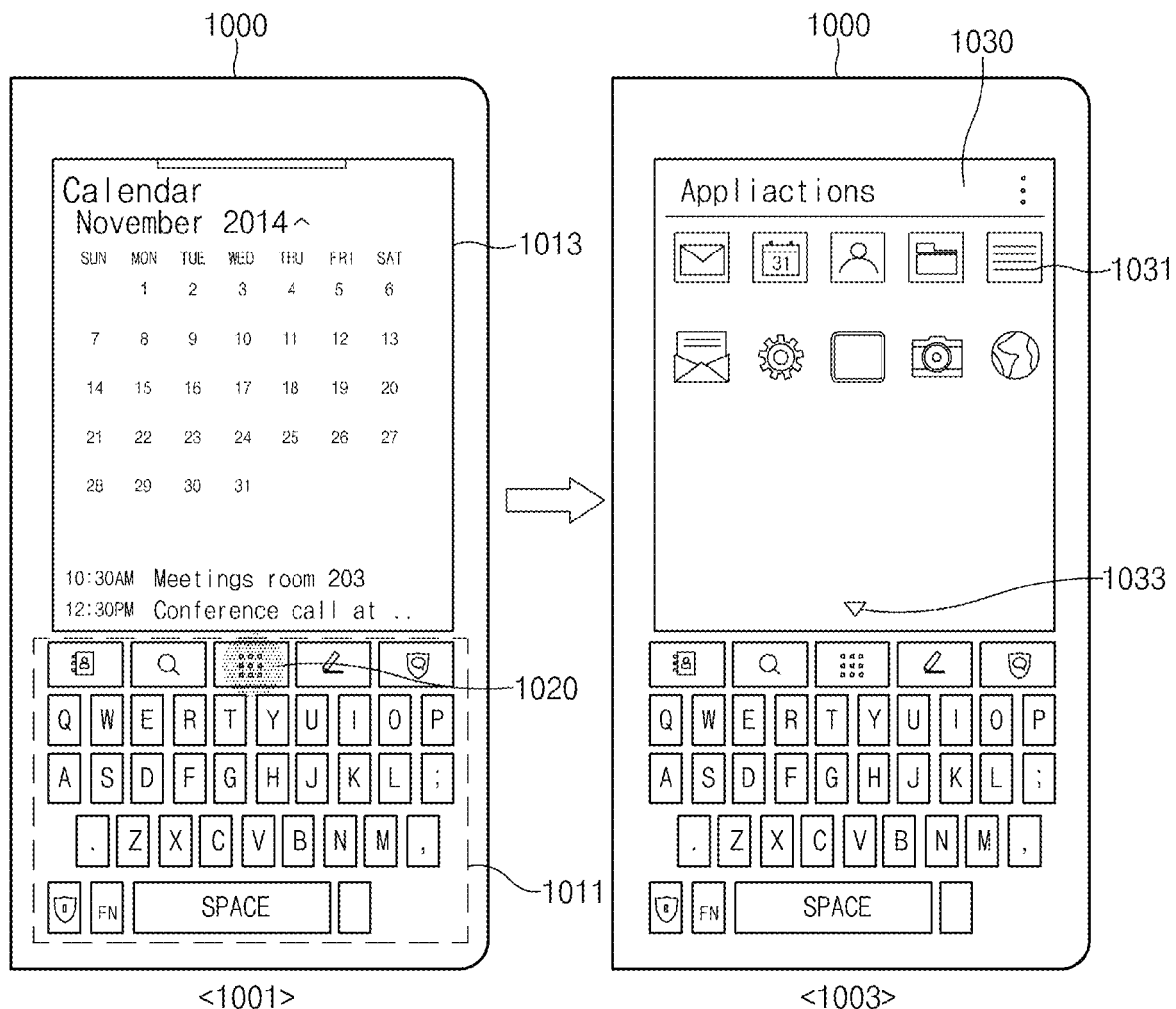
FIG. 10 is a view for explaining selection and execution of an application in a state in which a cover is closed, according to an embodiment.

FIG. 10 is a view for explaining selection and execution of an application in a state in which a cover is closed, according to an embodiment.

Referring to FIG. 10, as in a first state 1001, an electronic device (e.g., the electronic device 100 of FIG. 1A) may output a first screen related to a first security function on an area of a display (e.g., the area 111a of FIG. 1C) that corresponds to a second area 1013 of a cover 1000, in the state in which the cover 1000 is closed (e.g., a first arrangement state). According to various embodiments, as in a second state 1003, the electronic device may output an application selection screen 1030 included in the first security function on the first screen in response to a selection 1020 of a specific input object among input objects arranged in a first area 1011 of the cover 1000.

According to various embodiments, the application selection screen 1030 may include execution icons 1031 of one or more applications included in the first security function. According to an embodiment, the electronic device may arrange and display the execution icons 1031 of the applications, based on the installation time, the last execution time, or the name (e.g., package name) of each application. According to various embodiments, the application selection screen 1030 may include a screen scroll button 1033 in a region (e.g., a lower region) thereof. According to various embodiments, the electronic device may scroll and output the application selection screen 1030 in response to a selection of the screen scroll button 1033. In some embodiments, the electronic device may not output the screen scroll button 1033 in the case where the number of execution icons 1031 of the applications output on the application selection screen 1030 is less than or equal to a specified number.

According to various embodiments, an execution icon of an application included in a second security function may be displayed on the application selection screen 1030. According to various embodiments, when the execution icon of the application included in the second security function is selected, the electronic device may switch the first security function to the second security function and may output an execution screen of the selected application.

Figure 11:
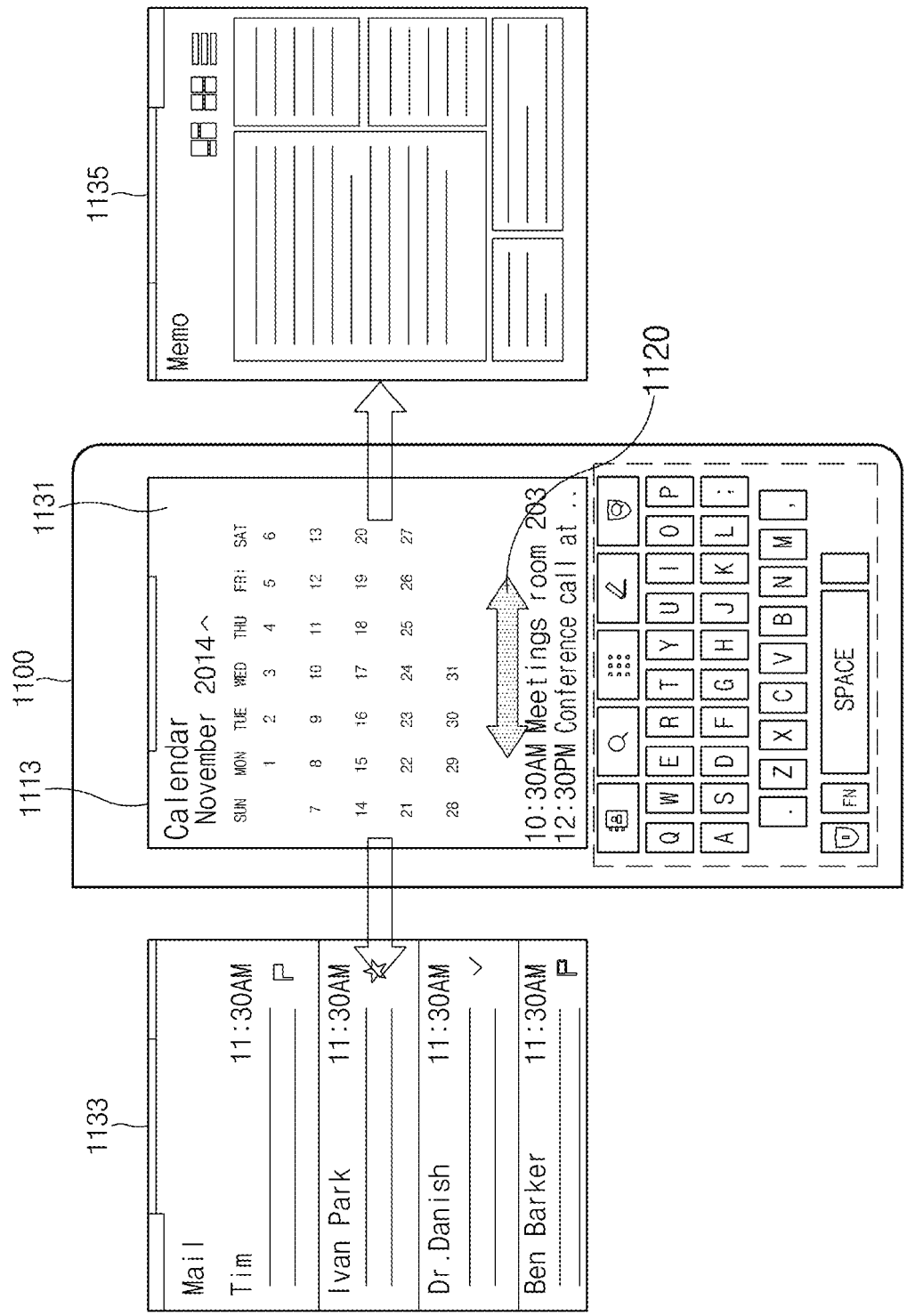
FIG. 11 is a view for explaining a switch of an application in a state in which a cover is closed, according to an embodiment.

FIG. 11 is a view for explaining an application switch in a state in which a cover is closed, according to an embodiment.

Referring to FIG. 11, an electronic device (e.g., the electronic device 100 of FIG. 1A) may output a first screen related to a first security function on an area of a display (e.g., the area 111a of FIG. 1C) that corresponds to a second area 1113 of a cover 1100, in the state in which the cover 1100 is closed (e.g., a first arrangement state). The shown drawing illustrates a state in which the electronic device outputs an execution screen 1131 of a schedule management application included in the first security function on the first screen.

According to various embodiments, the electronic device may switch the output execution screen of the application to an execution screen (e.g., a third screen) of another application related to the first security function when a specified user input (e.g., a gesture input 1120) is applied to the second area 1113 of the cover 1100. In some embodiments, the electronic device may also switch the output execution screen of the application to an execution screen of another application included in a second security function. For example, the electronic device may switch the first security function to the second security function and may output an execution screen of an application that is selected to be a second screen related to the second security function.

The shown drawing illustrates a state in which the electronic device switches the execution screen 1131 of the schedule management application to an execution screen 1133 of a mail management application in response to a leftward swipe input of the gesture input 1120. Furthermore, the electronic device may switch the execution screen 1131 of the schedule management application to an execution screen 1135 of a memo application in response to a rightward swipe input of the gesture input 1120.

According to various embodiments, the electronic device may specify a switching sequence of an application, based on the installation time, the last execution time, or the name (e.g., package name) of the application. According to various embodiments, the electronic device may switch and output an execution screen of the corresponding application according to the switching sequence of the application in response to the gesture input 1120. For example, the electronic device may switch the execution screen of the corresponding application to an execution screen of the previous (or next) application in response to a swipe input from right to left and may switch the execution screen of the corresponding application to an execution screen of the next (or previous) application in response to a swipe input from left to right.

Figure 12:
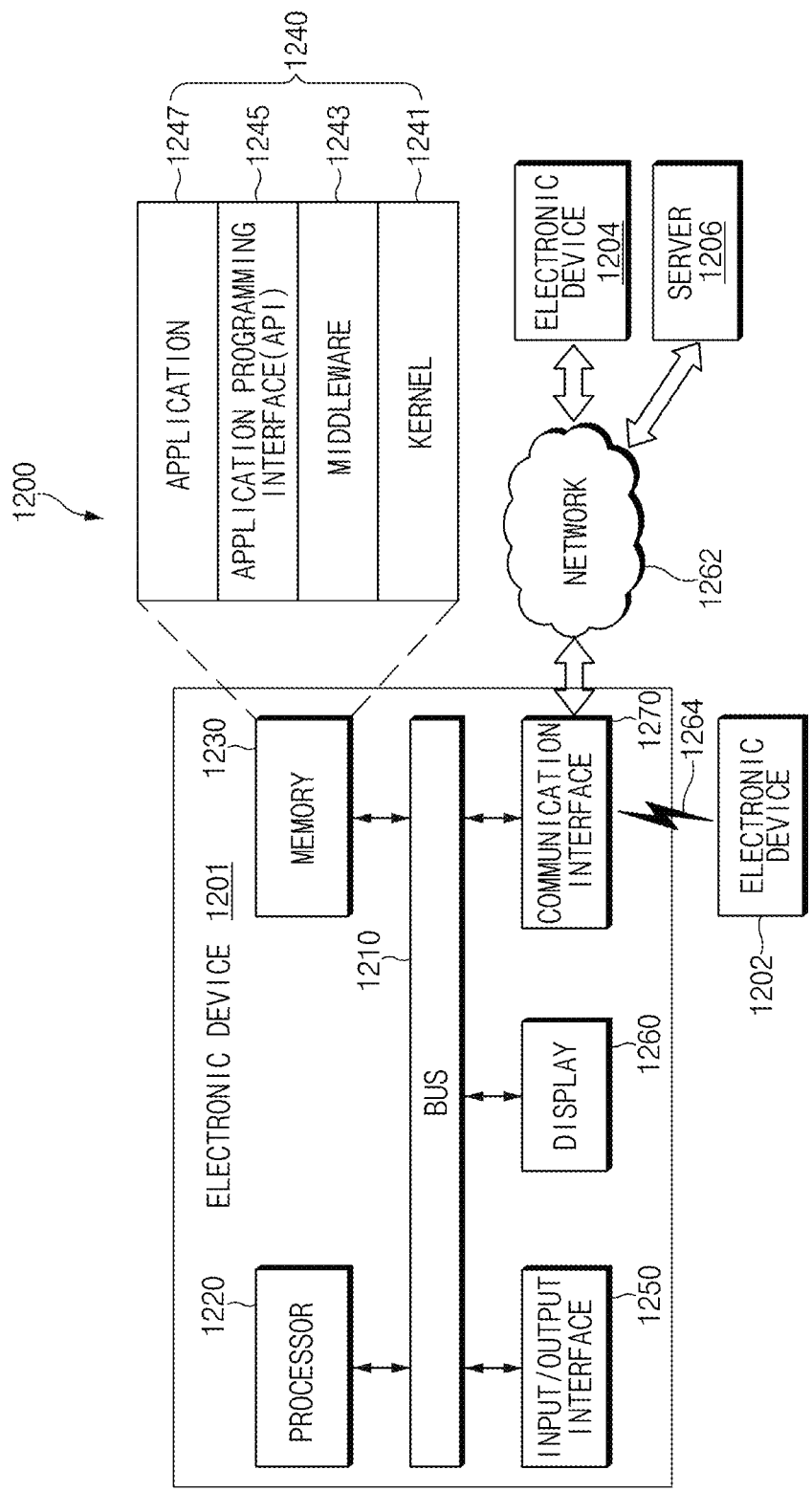
FIG. 12 illustrates an electronic device in a network environment according to an embodiment.

FIG. 12 illustrates an electronic device in a network environment system, according to an embodiment.

Referring to FIG. 12, according to various embodiments, an electronic device 1201 in a network environment 1200 is described. The electronic device 1201 may include a bus 1210, a processor 1220, a memory 1230, an input/output interface 1250, a display 1260, and a communication interface 1270. According to an embodiment, the electronic device 1201 may not include at least one of the above-described elements or may further include other element(s).

For example, the bus 1210 may interconnect the above-described elements 1210 to 1270 and may include a circuit for conveying communications (e.g., a control message and/or data) among the above-described elements.

The processor 1220 may include one or more of a central processing unit (CPU), an application processor (AP), or a communication processor (CP). For example, the processor 1220 may perform an arithmetic operation or data processing associated with control and/or communication of at least other elements of the electronic device 1201.

The memory 1230 may include a volatile and/or nonvolatile memory. For example, the memory 1230 may store commands or data associated with at least one other element (s) of the electronic device 1201. According to an embodiment, the memory 1230 may store software and/or a program 1240. The program 1240 may include, for example, a kernel 1241, a middleware 1243, an application programming interface (API) 1245, and/or an application program (or "an application") 1247. At least a part of the kernel 1241, the middleware 1243, or the API 1245 may be referred to as an "operating system (OS)".

For example, the kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform, for example, a mediation role such that the API 1245 or the application program 1247 communicates with the kernel 1241 to exchange data.

Furthermore, the middleware 1243 may process task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be, for example, an interface through which the application program 1247 controls a function provided by the kernel 1241 or the middleware 1243, and may include, for example, at least one interface or function (e.g., an instruction) for a file control, a window control, image processing, a character control, or the like.

The input/output interface 1250 may play a role, for example, of an interface which transmits a command or data input from a user or another external device, to other element(s) of the electronic device 1201. Furthermore, the input/output interface 1250 may output a command or data, received from other element(s) of the electronic device 1201, to a user or another external device.

The display 1260 may include, for example, a liquid crystal display (LCD), a light-emitting diode (LED) display, an organic LED (OLED) display, a microelectromechanical systems (MEMS) display, or an electronic paper display. The display 1260 may display, for example, various contents (e.g., a text, an image, a video, an icon, a symbol, and the like) to a user. The display 1260 may include a touch screen and may receive, for example, a touch, gesture, proximity, or hovering input using an electronic pen or a part of a user's body.

For example, the communication interface 1270 may establish communication between the electronic device 1201 and an external device (e.g., the first external electronic device 1202, the second external electronic device 1204, or the server 1206). For example, the communication interface 1270 may be connected to the network 1262 over wireless communication or wired communication to communicate with the external device (e.g., the second external electronic device 1204 or the server 1206).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1264. The short range communication 1264 may include at least one of wireless fidelity (WiFi), Bluetooth, near field communication (NFC), magnetic stripe transmission (MST), a global navigation satellite system (GNSS), or the like. The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1262 may include at least one of telecommunications networks, for example, a computer network (e.g., LAN or WAN), an Internet, or a telephone network.

Each of the first and second external electronic devices 1202 and 1204 may be a device of which the type is different from or the same as that of the electronic device 1201. According to an embodiment, the server 1206 may include a group of one or more servers. According to various embodiments, all or a portion of operations that the electronic device 1201 will perform may be executed by another or plural electronic devices (e.g., the electronic device 1202 or 1204 or the server 1206). According to an embodiment, in the case where the electronic device 1201 executes any function or service automatically or in response to a request, the electronic device 1201 may not perform the function or the service internally, but, alternatively additionally, it may request at least a portion of a function associated with the electronic device 1201 from another device (e.g., the electronic device 1202 or 1204 or the server 1206). The other electronic device (e.g., the electronic device 1202 or 1204 or the server 1206) may execute the requested function or additional function and may transmit the execution result to the electronic device 1201. The electronic device 1201 may provide the requested function or service using the received result or may additionally process the received result to provide the requested function or service. To this end, for example, cloud computing, distributed computing, or client-server computing may be used.

Figure 13:
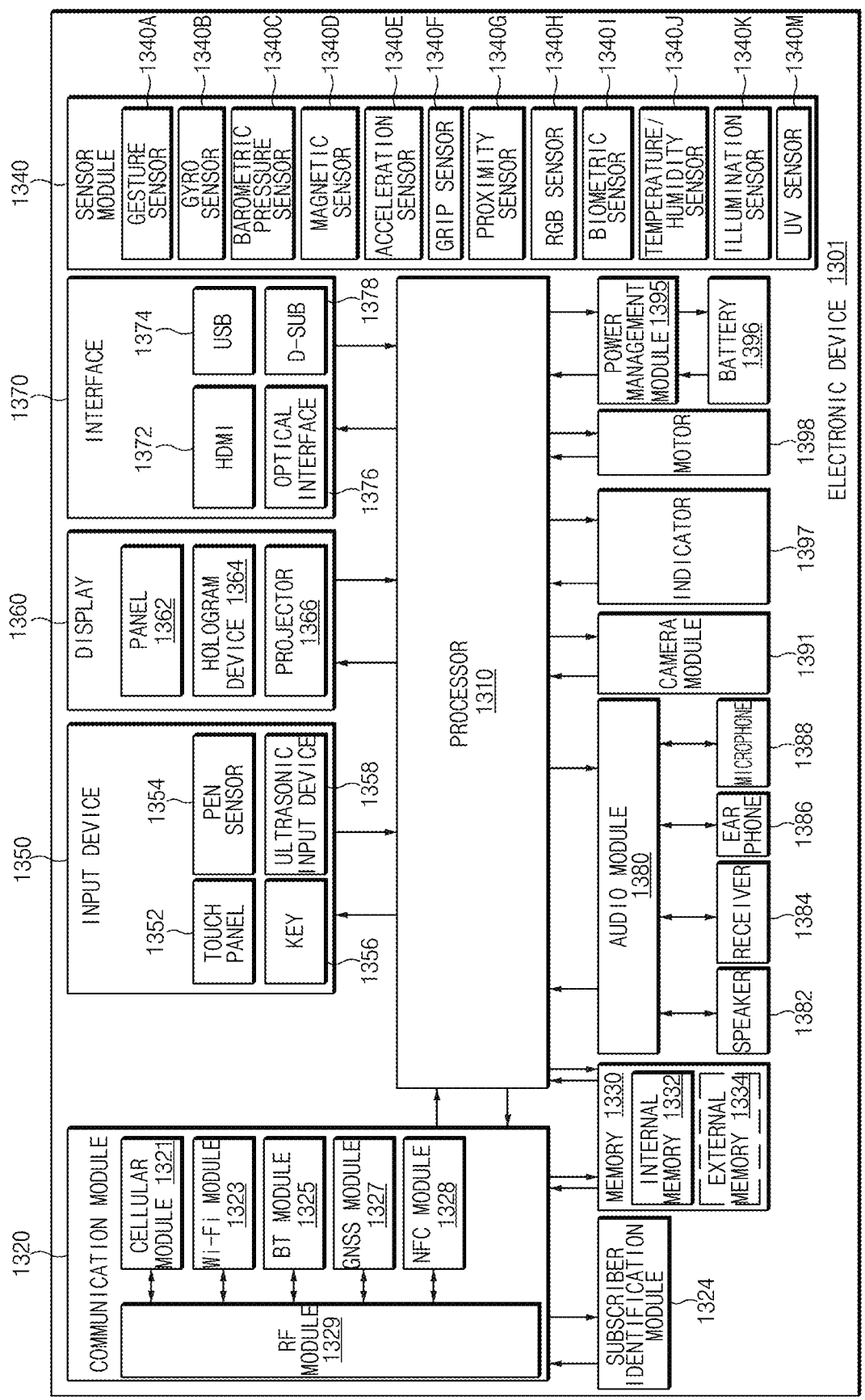
FIG. 13 illustrates a block diagram of an electronic device according to an embodiment.

FIG. 13 illustrates a block diagram of an electronic device, according to an embodiment.

Referring to FIG. 13, an electronic device 1301 may include, for example, all or a part of the electronic device 1201 illustrated in FIG. 12. The electronic device 1301 may include one or more processors (e.g., an application processor (AP)) 1310, a communication module 1320, a subscriber identification module 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an operating system (OS) or an application to control a plurality of hardware or software elements connected to the processor 1310 and may process and compute a variety of data. For example, the processor 1310 may be implemented with a System on Chip (SoC). According to an embodiment, the processor 1310 may further include a graphic processing unit (GPU) and/or an image signal processor. The processor 1310 may include at least a part (e.g., a cellular module 1321) of elements illustrated in FIG. 13. The processor 1310 may load a command or data, which is received from at least one of other elements (e.g., a nonvolatile memory), into a volatile memory and process the loaded command or data. The processor 1310 may store a variety of data in the nonvolatile memory.

The communication module 1320 may be configured the same as or similar to the communication interface 1270 of FIG. 12. The communication module 1320 may include the cellular module 1321, a WiFi module 1323, a Bluetooth (BT) module 1325, a GNSS module 1327 (e.g., a GPS module, a Glonass module, a Beidou module, or a Galileo module), a near field communication (NFC) module 1328, and a radio frequency (RF) module 1329.

The cellular module 1321 may provide, for example, voice communication, video communication, a character service, an Internet service, or the like over a communication network. According to an embodiment, the cellular module 1321 may perform discrimination and authentication of the electronic device 1301 within a communication network by using the subscriber identification module (e.g., a SIM card) 1324. According to an embodiment, the cellular module 1321 may perform at least a portion of functions that the processor 1310 provides. According to an embodiment, the cellular module 1321 may include a communication processor (CP).

Each of the WiFi module 1323, the BT module 1325, the GNSS module 1327, the NFC module 1328, or the MST module 1326 may include a processor for processing data exchanged through a corresponding module, for example. According to an embodiment, at least a part (e.g., two or more) of the cellular module 1321, the WiFi module 1323, the BT module 1325, the GNSS module 1327, or the NFC module 1328 may be included within one Integrated Circuit (IC) or an IC package.

For example, the RF module 1329 may transmit and receive a communication signal (e.g., an RF signal). For example, the RF module 1329 may include a transceiver, a power amplifier module (PAM), a frequency filter, a low noise amplifier (LNA), an antenna, or the like. According to another embodiment, at least one of the cellular module 1321, the WiFi module 1323, the BT module 1325, the GNSS module 1327, or the NFC module 1328 may transmit and receive an RF signal through a separate RF module.

The subscriber identification module 1324 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1330 (e.g., the memory 1230) may include an internal memory 1332 or an external memory 1334. For example, the internal memory 1332 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1334 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1334 may be operatively and/or physically connected to the electronic device 1301 through various interfaces.

The sensor module 1340 may measure, for example, a physical quantity or may detect an operation state of the electronic device 1301. The sensor module 1340 may convert the measured or detected information to an electric signal. For example, the sensor module 1340 may include at least one of a gesture sensor 1340A, a gyro sensor 1340B, a barometric pressure sensor 1340C, a magnetic sensor 1340D, an acceleration sensor 1340E, a grip sensor 1340F, the proximity sensor 1340G, a color sensor 1340H (e.g., red, green, blue (RGB) sensor), a biometric sensor 1340I, a temperature/humidity sensor 1340J, an illuminance sensor 1340K, or an UV sensor 1340M. Although not illustrated, additionally or alternatively, the sensor module 1340 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1340 may further include a control circuit for controlling at least one or more sensors included therein. According to an embodiment, the electronic device 1301 may further include a processor that is a part of the processor 1310 or independent of the processor 1310 and is configured to control the sensor module 1340. The processor may control the sensor module 1340 while the processor 1310 remains at a sleep state.

The input device 1350 may include, for example, a touch panel 1352, a (digital) pen sensor 1354, a key 1356, or an ultrasonic input unit 1358. For example, the touch panel 1352 may use at least one of capacitive, resistive, infrared and ultrasonic detecting methods. Also, the touch panel 1352 may further include a control circuit. The touch panel 1352 may further include a tactile layer to provide a tactile reaction to a user.

The (digital) pen sensor 1354 may be, for example, a part of a touch panel or may include an additional sheet for recognition. The key 1356 may include, for example, a physical button, an optical key, a keypad, or the like. The ultrasonic input device 1358 may detect (or sense) an ultrasonic signal, which is generated from an input device, through a microphone (e.g., a microphone 1388) and may check data corresponding to the detected ultrasonic signal.

The display 1360 (e.g., the display 1260) may include a panel 1362, a hologram device 1364, or a projector 1366. The panel 1362 may be the same as or similar to the display 1260 illustrated in FIG. 12. The panel 1362 may be implemented, for example, to be flexible, transparent or wearable. The panel 1362 and the touch panel 1352 may be integrated into a single module. The hologram device 1364 may display a stereoscopic image in a space using a light interference phenomenon. The projector 1366 may project light onto a screen so as to display an image. For example, the screen may be arranged in the inside or the outside of the electronic device 1301. According to an embodiment, the display 1360 may further include a control circuit for controlling the panel 1362, the hologram device 1364, or the projector 1366.

The interface 1370 may include, for example, a high-definition multimedia interface (HDMI) 1372, a universal serial bus (USB) 1374, an optical interface 1376, or a D-subminiature (D-sub) 1378. The interface 1370 may be included, for example, in the communication interface 1270 illustrated in FIG. 12. Additionally or alternatively, the interface 1370 may include, for example, a mobile high definition link (MHL) interface, a SD card/multi-media card (MMC) interface, or an infrared data association (IrDA) standard interface.

The audio module 1380 may convert a sound and an electric signal in dual directions. At least a part of the audio module 1380 may be included, for example, in the input/output interface 1250 illustrated in FIG. 12. The audio module 1380 may process, for example, sound information that is input or output through a speaker 1382, a receiver 1384, an earphone 1386, or the microphone 1388.

For example, the camera module 1391 may shoot a still image or a video. According to an embodiment, the camera module 1391 may include at least one or more image sensors (e.g., a front sensor or a rear sensor), a lens, an image signal processor (ISP), or a flash (e.g., an LED or a xenon lamp).

The power management module 1395 may manage, for example, power of the electronic device 1301. According to an embodiment, a power management integrated circuit (PMIC), a charger IC, or a battery or fuel gauge may be included in the power management module 1395. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, and the like. The motor 1398 may convert an electrical signal into a mechanical vibration and may generate the following effects: vibration, haptic, and the like. Although not illustrated, a processing device (e.g., a GPU) for supporting a mobile TV may be included in the electronic device 1301. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 14:
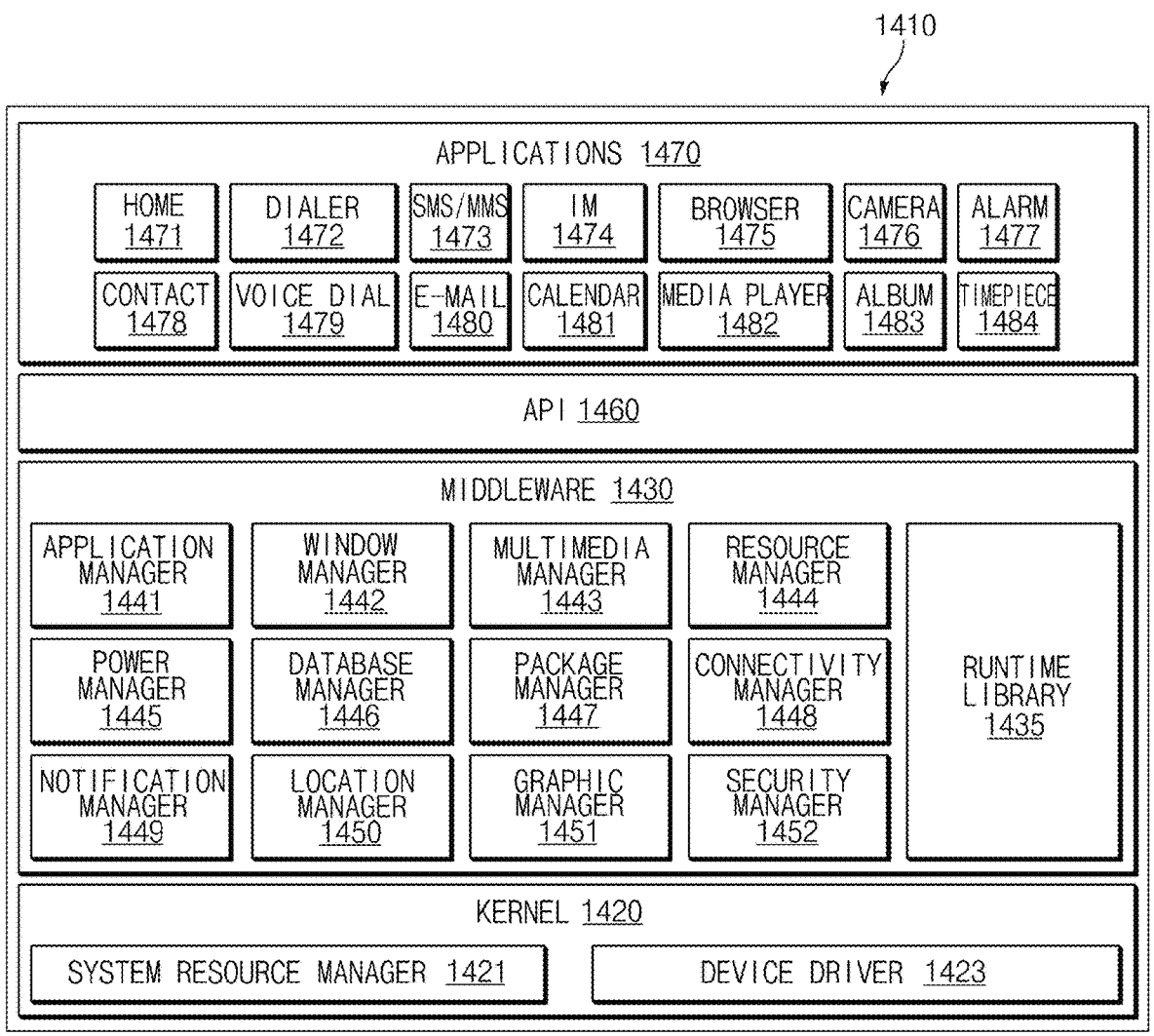
FIG. 14 illustrates a block diagram of a program module according to an embodiment.

FIG. 14 illustrates a block diagram of a program module, according to various embodiments.

According to an embodiment, a program module 1410 (e.g., the program 1240) may include an operating system (OS) to control resources associated with an electronic device (e.g., the electronic device 1201), and/or diverse applications (e.g., the application program 1247) driven on the OS. The OS may be, for example, Android™, iOS™, Windows™, Symbian™, Tizen™, or Bada™.

Referring to FIG. 14, the program module 1410 may include a kernel 1420, a middleware 1430, an application programming interface (API) 1460, and/or an application 1470. At least a portion of the program module 1410 may be preloaded on an electronic device or may be downloadable from an external electronic device (e.g., the electronic device 1202 or 1204, the server 1206, or the like).

The kernel 1420 (e.g., the kernel 1241) may include, for example, a system resource manager 1421 or a device driver 1423. The system resource manager 1421 may perform control, allocation, or retrieval of system resources. According to an embodiment, the system resource manager 1421 may include a process managing unit, a memory managing unit, or a file system managing unit. The device driver 1423 may include, for example, a display driver, a camera driver, a Bluetooth driver, a shared memory driver, a USB driver, a keypad driver, a WiFi driver, an audio driver, or an inter-process communication (IPC) driver.

The middleware 1430 may provide, for example, a function that the application 1470 needs in common, or may provide diverse functions to the application 1470 through the API 1460 to allow the application 1470 to efficiently use limited system resources of the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module that is used by a compiler to add a new function through a programming language while the application 1470 is being executed. The runtime library 1435 may perform input/output management, memory management, or capacities about arithmetic functions.

The application manager 1441 may manage, for example, a life cycle of at least one application of the application 1470. The window manager 1442 may manage a graphic user interface (GUI) resource that is used in a screen. The multimedia manager 1443 may identify a format necessary for playing diverse media files, and may perform encoding or decoding of media files by using a codec suitable for the format. The resource manager 1444 may manage resources such as a storage space, memory, or source code of at least one application of the application 1470.

The power manager 1445 may operate, for example, with a basic input/output system (BIOS) to manage a battery or power, and may provide power information for an operation of an electronic device. The database manager 1446 may generate, search for, or modify database that is to be used in at least one application of the application 1470. The package manager 1447 may install or update an application that is distributed in the form of package file.

The connectivity manager 1448 may manage, for example, wireless connection such as WiFi or Bluetooth. The notification manager 1449 may display or notify an event such as arrival message, appointment, or proximity notification in a mode that does not disturb a user. The location manager 1450 may manage location information about an electronic device. The graphic manager 1451 may manage a graphic effect that is provided to a user, or manage a user interface relevant thereto. The security manager 1452 may provide a general security function necessary for system security, user authentication, or the like. According to an embodiment, in the case where an electronic device (e.g., the electronic device 1201) includes a telephony function, the middleware 1430 may further include a telephony manager for managing a voice or video call function of the electronic device.

The middleware 1430 may include a middleware module that combines diverse functions of the above-described elements. The middleware 1430 may provide a module specialized to each OS kind to provide differentiated functions. Additionally, the middleware 1430 may dynamically remove a part of the preexisting elements or may add new elements thereto.

The API 1460 (e.g., the API 1245) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1470 (e.g., the application program 1247) may include, for example, one or more applications capable of providing functions for a home 1471, a dialer 1472, an SMS/MMS 1473, an instant message (IM) 1474, a browser 1475, a camera 1476, an alarm 1477, a contact 1478, a voice dial 1479, an e-mail 1480, a calendar 1481, a media player 1482, an album 1483, or a timepiece 1484, or for offering health care (e.g., measuring an exercise quantity, blood sugar, or the like) or environment information (e.g., information of barometric pressure, humidity, temperature, or the like).

According to an embodiment, the application 1470 may include an application (hereinafter referred to as "information exchanging application" for descriptive convenience) to support information exchange between an electronic device (e.g., the electronic device 1201) and an external electronic device (e.g., the electronic device 1202 or 1204). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1202 or 1204). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1202 or 1204)which communicates with the electronic device, an application running in the external electronic device, or a service (e.g., a call service, a message service, or the like) provided from the external electronic device.

According to an embodiment, the application 1470 may include an application (e.g., a health care application of a mobile medical device) that is assigned in accordance with an attribute of an external electronic device (e.g., the electronic device 1202 or 1204). According to an embodiment, the application 1470 may include an application that is received from an external electronic device (e.g., the electronic device 1202 or 1204, or the server 1206). According to an embodiment, the application 1470 may include a preloaded application or a third party application that is downloadable from a server. The names of elements of the program module 1410 according to the embodiment may be modifiable depending on kinds of operating systems.

According to various embodiments, at least a portion of the program module 1410 may be implemented by software, firmware, hardware, or a combination of two or more thereof. At least a portion of the program module 1410 may be implemented (e.g., executed), for example, by the processor (e.g., the processor 1310). At least a portion of the program module 1410 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1220), may cause the one or more processors to perform a function corresponding to the instruction. The computer-readable storage media, for example, may be the memory 1230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a housing;
a display disposed on a surface of the housing;
a cover including a plurality of input objects disposed on a first area, and a transparent panel disposed in a second area, wherein the cover is disposed to cover the display such that at least a portion of the display is able to be closed, corresponding to a first arrangement state of the cover, and opened, corresponding to a second arrangement state of the cover; and
a secure area that comprises a partial area of memory;
a processor electrically connected with the display,
wherein the processor is configured to:
output a first screen related to a first security function on a first part of the display that corresponds to the second area and execute a user authentication for the first security function, when the cover is in the first arrangement state; and when the cover is changed from the first arrangement state to the second arrangement state and the first screen is an execution screen of a specified application, resize and output the first screen on a second part of the display, wherein the second part of the display is larger than the first part of the display, when the cover is changed from the first arrangement state to the second arrangement state and the first screen is not the execution screen of the specified application, output a second screen related to a second security function on the second part of the display, wherein an access to the secure area is permitted when the processor executes the first security function and blocks an execution of the second security function.

2. The electronic device of claim 1, wherein the processor is configured to, in response to an input for selecting the first area in the first arrangement state, execute a first function corresponding to the input and output an execution screen of the first function on the first part of the display that corresponds to the second area.

3. The electronic device of claim 2, wherein the processor is configured to output, on a partial area of the first screen, a display object corresponding to a second function associated with the first function.

4. The electronic device of claim 1, wherein the processor is configured to switch the first screen to a third screen related to the first security function in response to a specified gesture input to the second area.

5. The electronic device of claim 1, wherein the processor is configured to switch the first screen to the second screen in response to an input for selecting a specified input object, among the plurality of input objects arranged in the first area, in the first arrangement state.

6. The electronic device of claim 5, wherein the processor is configured to switch the second screen to the first screen in response to an input for selecting the specified input object in a state in which the first screen is switched to the second screen.

7. The electronic device of claim 1, wherein the processor is configured to provide a notification related to the second security function on a partial area of the first screen when the notification related to the second security function is generated in the first arrangement state.

8. The electronic device of claim 1, wherein the first security function is operated on a first operating system, and the second security function is operated on a second operating system, and wherein the processor is configured to: switch the first operating system into an active state and the second operating system into an inactive state when the cover is in the first arrangement state; and switch the first operating system into an inactive state and the second operating system into an active state when the cover is in the second arrangement state.

9. The electronic device of claim 1, wherein the transparent panel is electrically connected to the processor to output at least one display object, and wherein the processor is configured to output the first screen on at least a partial area of the transparent panel in the first arrangement state.

10. The electronic device of claim 1, wherein at least one of the plurality of input objects is electrically connected to the processor, and wherein the processor is configured to process a function corresponding to the at least one of the plurality of input objects in response to an input for selecting the at least one of the plurality of input objects.

11. A method for controlling a screen output of an electronic device, the method comprising:

detecting an occurrence of a specified event;

determining an arrangement state of a cover that includes a plurality of input objects disposed on a first area, and a transparent panel disposed in a second area, wherein the cover is disposed to cover a display such that at least a portion of the display is able to be closed, corresponding to a first arrangement state of the cover, and opened, corresponding to a second arrangement state of the cover;

outputting a first screen related to a first security function on a first part of the display that corresponds to the second area and executing a user authentication for the first security function, when the cover is in the first arrangement state; and when the cover is changed from the first arrangement state to the second arrangement state and the first screen is an execution screen of a specified application, resize and output the first screen on a second part of the display, wherein the second part of the display is larger than the first part of the display, when the cover is changed from the first arrangement state to the second arrangement state and the first screen is not the execution screen of the specified application, outputting a second screen related to a second security function on the second part of the display, wherein an access to a secure area that comprises a partial area of memory is permitted when the first security function is executed and the second security function is blocked.

12. The method of claim 11, further comprising: switching the first screen to the second screen in response to an input for selecting a specified input object, among the plurality of input objects arranged in the first area, in the first arrangement state.

13. The method of claim 12, further comprising: switching the second screen to the first screen in response to an input for selecting the specified input object in a state in which the first screen is switched to the second screen.

14. The method of claim 11, wherein the first security function is operated on a first operating system, and the second security function is operated on a second operating system, and wherein the method further comprises: switching the first operating system into an active state and the second operating system into an inactive state when the cover is in the first arrangement state; and switching the first operating system into an inactive state and the second operating system into an active state when the cover is in the second arrangement state.

15. A non-transitory computer readable medium configured to store instructions for operating an electronic device including a cover, a display, and one or more processors, and the instructions, when executed by the one or more processors, cause the electronic device to:

detect an occurrence of a specified event;

determine an arrangement state of the cover that includes a plurality of input objects disposed on a first area, and a transparent panel disposed in a second area, wherein the cover is disposed to cover the display such that at least a portion of the display is able to be closed, corresponding to a first arrangement state of the cover, and opened, corresponding to a second arrangement state of the cover;

output a first screen related to a first security function on a first part of the display that corresponds to the second area and executing a user authentication for the first security function, when the cover is in the first arrangement state; and when the cover is changed from the first arrangement state to the second arrangement state and the first screen is an execution screen of a specified application, resize and output the first screen on a second part of the display, wherein the second part of the display is larger than the first part of the display, when the cover is changed from the first arrangement state to the second arrangement state and the first screen is not the execution screen of the specified application, output a second screen related to a second security function on the second part of the display, wherein an access to a secure area that comprises a partial area of memory is permitted when the one or more processors execute the first security function and block an execution of the second security function.

16. The non-transitory computer readable medium of claim 15, further comprising instructions that, when executed by the one or more processors, cause the electronic device to: switch the first screen to the second screen in response to an input for selecting a specified input object, among the plurality of input objects arranged in the first area, in the first arrangement state.

17. The non-transitory computer readable medium of claim 16, further comprising instructions that, when executed by the one or more processors, cause the electronic device to: switch the second screen to the first screen in response to an input for selecting the specified input object in a state in which the first screen is switched to the second screen.

18. The non-transitory computer readable medium of claim 15, wherein the first security function is operated on a first operating system, and the second security function is operated on a second operating system, and the non-transitory computer readable medium further comprising instructions that, when executed by the one or more processors, cause the electronic device to: switch the first operating system into an active state and the second operating system into an inactive state when the cover is in the first arrangement state; and switch the first operating system into an inactive state and the second operating system into an active state when the cover is in the second arrangement state.

19. The non-transitory computer readable medium of claim 15, further comprising instructions that, when executed by the one or more processors, cause the electronic device to: switch the first screen to a third screen related to the first security function in response to a specified gesture input to the second area.

* * * * *